(12) United States Patent
Miyamoto et al.

(10) Patent No.: US 9,879,770 B2
(45) Date of Patent: Jan. 30, 2018

(54) LOCKING DIFFERENTIAL

(71) Applicant: TAP Worldwide, LLC, Compton, CA (US)

(72) Inventors: Jason M. Miyamoto, San Diego, CA (US); Jacob A. Hunt, San Diego, CA (US)

(73) Assignee: TAP Worldwide, LLC, Compton, CA (US)

( * ) Notice: Subject to any disclaimer, the term of this patent is extended or adjusted under 35 U.S.C. 154(b) by 141 days.

(21) Appl. No.: 14/681,422

(22) Filed: Apr. 8, 2015

(65) Prior Publication Data

US 2015/0292611 A1 Oct. 15, 2015

Related U.S. Application Data

(60) Provisional application No. 61/977,542, filed on Apr. 9, 2014.

(51) Int. Cl.
   *F16H 48/24* (2006.01)
   *F16H 48/08* (2006.01)
   *F16H 48/32* (2012.01)

(52) U.S. Cl.
   CPC ............. *F16H 48/24* (2013.01); *F16H 48/08* (2013.01); *F16H 48/32* (2013.01)

(58) Field of Classification Search
   None
   See application file for complete search history.

(56) References Cited

U.S. PATENT DOCUMENTS

| 4,249,429 A * | 2/1981 | Denning ................. F16H 48/08 475/241 |
| 4,759,232 A * | 7/1988 | Roberts ................... F16H 48/08 475/86 |
| 5,342,255 A | 8/1994 | Slesinski et al. |
| 5,484,347 A | 1/1996 | Holmquist |
| 5,556,344 A | 9/1996 | Fox |
| 5,591,098 A | 1/1997 | Jones et al. |
| 5,630,773 A | 5/1997 | Slicker et al. |
| 5,673,777 A | 10/1997 | Ziech |
| 5,938,555 A | 8/1999 | Leeper |
| 5,947,252 A | 9/1999 | Ziech |
| 5,947,859 A | 9/1999 | McNamara |
| 5,951,426 A | 9/1999 | Forrest |

(Continued)

FOREIGN PATENT DOCUMENTS

AU 565257 6/1985

OTHER PUBLICATIONS

ARB Air Locker, 3 pages, accessed Jun. 13, 2013.

(Continued)

*Primary Examiner* — Erin D Bishop
*Assistant Examiner* — Lori Wu
(74) *Attorney, Agent, or Firm* — Austin Holt; Eric Severson

(57) ABSTRACT

Locking differentials are described that include a first orientation and a second orientation. In the first orientation, the locking differential has a default unlocked position and must be actuated to be locked. In the second orientation, the locking differential has a default locked position and must be actuated to be unlocked. The user selects whether the locking differential is in the first orientation or the second orientation.

18 Claims, 34 Drawing Sheets

(56) References Cited

U.S. PATENT DOCUMENTS

| | | |
|---|---|---|
| 5,989,147 A | 11/1999 | Forrest et al. |
| 6,001,040 A | 12/1999 | Engle |
| 6,016,102 A | 1/2000 | Fortune et al. |
| 6,076,644 A | 1/2000 | Forrest et al. |
| 6,019,694 A | 2/2000 | Forrest et al. |
| 6,083,134 A | 7/2000 | Godlew |
| 6,165,095 A | 12/2000 | Till et al. |
| 6,183,387 B1 * | 2/2001 | Yoshioka .............. B60K 23/04 475/88 |
| 6,254,505 B1 | 7/2001 | Forrest |
| 6,261,202 B1 | 7/2001 | Forrest et al. |
| 6,309,320 B1 | 10/2001 | Forrest et al. |
| 6,319,166 B1 | 11/2001 | Kyle et al. |
| 6,324,928 B1 | 12/2001 | Hughes |
| 6,394,927 B1 | 5/2002 | Bongard |
| 6,398,531 B1 | 6/2002 | Andres |
| 6,432,020 B1 | 8/2002 | Rivera et al. |
| 6,527,661 B2 | 3/2003 | Leeper |
| 6,551,209 B2 | 4/2003 | Cheadle et al. |
| 6,582,336 B2 | 7/2003 | Munday et al. |
| 6,607,049 B2 | 8/2003 | Cigal |
| 6,702,070 B2 | 3/2004 | Smith |
| 6,719,662 B2 | 4/2004 | Forrest et al. |
| 7,104,912 B2 | 9/2006 | Morgensai |
| 7,264,568 B2 | 9/2007 | Ludwig et al. |
| 7,264,569 B2 | 9/2007 | Fox |
| 7,357,749 B2 | 4/2008 | Nofzinger |
| 7,361,116 B2 | 4/2008 | Kyle et al. |
| D573,524 S | 7/2008 | Smith et al. |
| 7,438,661 B2 | 10/2008 | Kyle et al. |
| 7,549,941 B2 | 6/2009 | Boddy |
| 7,608,976 B1 | 10/2009 | Cheng et al. |
| 7,654,934 B2 | 2/2010 | Alfredson |
| 7,722,495 B1 | 5/2010 | Stanley |
| 7,729,734 B2 | 6/2010 | Mandelis |
| 7,871,350 B2 | 1/2011 | Bawks |
| 7,874,954 B2 | 1/2011 | Dissett |
| D635,589 S | 4/2011 | Bongard et al. |
| 8,043,184 B2 | 10/2011 | Boddy |
| 8,051,744 B2 | 11/2011 | Bawks |
| 8,096,913 B2 | 1/2012 | Allmendinger |
| 8,100,805 B2 | 1/2012 | Dayton |
| 8,109,358 B2 | 2/2012 | Dayton |
| 8,133,146 B2 | 3/2012 | Radzevich |
| 8,146,458 B2 | 4/2012 | Radzevich |
| 8,167,763 B2 | 5/2012 | Curtis |
| 8,216,106 B2 | 7/2012 | Curtis |
| 8,231,493 B2 | 7/2012 | Radzevich |
| 8,452,360 B2 | 5/2013 | Mandelis et al. |
| 8,579,752 B2 | 11/2013 | Fox et al. |
| 2004/0132572 A1 | 7/2004 | Ludwig et al. |
| 2007/0142155 A1 | 6/2007 | Schumacher |
| 2008/0058151 A1 | 3/2008 | Curtis |
| 2008/0300108 A1 | 12/2008 | Eybergen et al. |
| 2009/0011890 A1 | 1/2009 | Bawks |
| 2010/0251706 A1 | 10/2010 | Edler et al. |
| 2011/0021305 A1 | 1/2011 | Radzevich |
| 2012/0031212 A1 | 2/2012 | Forrest |
| 2012/0049675 A1 | 3/2012 | Vargo et al. |
| 2012/0180596 A1 | 7/2012 | Fox et al. |
| 2012/0238394 A1 * | 9/2012 | Valente ................ B60K 17/346 475/221 |
| 2012/0244987 A1 * | 9/2012 | Haugeberg ............. F16H 48/24 475/233 |
| 2013/0079187 A1 | 3/2013 | Edler |
| 2015/0053027 A1 * | 2/2015 | Downs ................. F16H 63/304 74/15.4 |
| 2015/0204431 A1 * | 7/2015 | Cochren ................ F16H 48/34 475/150 |

OTHER PUBLICATIONS

Eaton Automotive, 1 page, accessed Jun. 13, 2013.
Hook Up AuburnGear, 3 pages, accessed Jun. 13, 2013.
Ox Locker Instructions, OX Off Road 8 pages, accessed Jun. 13, 2013.
TJM, 7 pages, accessed Jul. 24, 2013.
Yukon Zip Locker, 16 pages, copyright 2009.

* cited by examiner

LOCKING DIFFERENTIAL

INCORPORATION BY REFERENCE TO ANY PRIORITY APPLICATIONS

Any and all applications identified in a priority claim in the Application Data Sheet, or any correction thereto, are hereby incorporated by reference herein and made a part of the present disclosure. This application claims the priority benefit under 35 U.S.C. §119(e) of U.S. Provisional Application No. 61/977,542 filed Apr. 9, 2014, the disclosure of which is hereby incorporated by reference in its entirety and should be considered a part of this specification.

FIELD OF THE INVENTION

The present invention generally relates to locking differentials. In particular, the present invention relates to locking differentials with that facilitate operation with either an owner-determined default locking configuration or default unlocking configuration.

DESCRIPTION OF THE RELATED ART

A locking differential is a differential that can be locked to couple the shafts connected to the wheels so that the wheels turn in unison. The locking differential prevents the wheels from rotating at different speeds. The wheels rotate as if connected to a common shaft. For example, if one wheel loses traction due to road conditions, such as ice, the locking differential causes both wheels to rotate at the same speed. The locking differential is useful when the two wheels experience significantly different traction conditions.

Although locking differentials have been in use for a significant period of time, there is a demand for continued improvement in the design and operation of locking differentials. For example, there is a push to reduce the cost of the locking differential, while designing a robust locking differential assembly.

SUMMARY OF THE INVENTION

An embodiment is a locking differential, including a planetary gear train. The locking differential includes a cage, wherein the cage surrounds the planetary gear train. The locking differential includes a ring that is coupled to the cage by fasteners. The fasteners extend perpendicular to the cage such that the fasteners undergo shear loading. The locking differential includes a cog that is coupled to the cage by fasteners. The fasteners extend perpendicular to the cage such that the fasteners undergo shear loading.

In some arrangements, the locking differential further includes a housing and an endplate, wherein the housing is coupled to the endplate. The ring, the cog, and the cage are coupled and can slide longitudinally relative to the housing and the endplate. The cog is configured to engage a gear of the planetary gear train such that the locking differential is locked. The cog is configured to disengage a gear of the planetary gear train such that the locking differential is unlocked.

An embodiment is a locking differential, including a planetary gear train. The locking differential has a first orientation and a second orientation. In the first orientation, the locking differential is unlocked and must be actuated to be locked. In the second orientation, the locking differential is locked and must be actuated to be unlocked. The user selects whether the locking differential is in the first orientation or the second orientation.

In some arrangements, the user positions a biasing element to select whether the locking differential is in the first orientation or the second orientation. In some arrangements, the user positions a biasing element between the housing and the cage such that the locking differential is in the first orientation. In the first orientation, the locking differential must be actuated to be locked. In some arrangements, the user positions a biasing element between the cog and the endplate such that the locking differential is in the second orientation. In the second orientation, the locking differential must be actuated to be unlocked.

In some arrangements, the locking differential is actuated by fluid. In some embodiments, the fluid is gas. In some embodiments, the fluid is liquid. The locking differential can have two inlets connected to at least one channel. The user couples one inlet to a fluid source to select whether the locking differential is in the first orientation or the second orientation. In some arrangements, the inlet not coupled to the fluid source is vented. In some embodiments, the fluid overcomes the force of the biasing element. In the first orientation, the fluid causes the locking differential to be locked. In the second orientation, the fluid causes the locking differential to be unlocked. In some arrangements, the fluid causes the longitudinal sliding of the ring, the cog, and the cage. In some arrangement, the fluid causes the longitudinal sliding of a fork coupled to the ring.

In some embodiments, the user couples a manual locking bar to the locking differential to select whether the locking differential is locked or unlocked. The manual locking bar can be used whether the locking differential is in the first orientation or the second orientation. The manual locking bar can be coupled to the ring, such that linear motion of the locking bar is transmitted to linear motion of the ring. In some arrangements, the manual locking bar can be coupled to the inlets.

In some arrangements, the locking differential can include a handle coupled to the manual locking bar and a spacer. The user can engage the handle to reposition the manual locking bar. The user can engage the spacer to maintain the position of the manual locking bar.

In some embodiments, a locking differential is provided. The locking differential can include a planetary gear train. The locking differential can include a cage, wherein the cage surrounds the planetary gear train. The locking differential can include a ring coupled to the cage by fasteners, wherein the fasteners extend perpendicular to the cage such that the fasteners undergo shear loading. The locking differential can include a cog coupled to the cage by fasteners, wherein the fasteners extend perpendicular to the cage such that the fasteners undergo shear loading.

In some embodiments, the cog is configured to engage a gear in the planetary gear train such that the locking differential is locked. In some embodiments, the cog is configured to disengage the gear in the planetary gear train such that the locking differential is unlocked. The locking differential can include a housing and an endplate, wherein the housing is coupled to the endplate. In some embodiments, the ring, the cog, and the cage are configured to slide longitudinally relative to the housing and the endplate. In some embodiments, the cog is configured to engage a gear in the planetary gear train such that the locking differential is locked. In some embodiments, the cog is configured to disengage the gear in the planetary gear train such that the locking differential is unlocked.

In some embodiments, a locking differential is provided. The locking differential can include a planetary gear train. The locking differential can include a cage, wherein the cage surrounds the planetary gear train. The locking differential can include a ring coupled to the cage by fasteners. The locking differential can include a cog coupled to the cage by fasteners. In some embodiments, the locking differential has a first orientation and a second orientation, wherein the locking differential is unlocked and must be actuated to be locked in the first orientation, and wherein the locking differential is locked and must be actuated to be unlocked in the second orientation.

In some embodiments, the user selects whether the locking differential is in the first orientation or the second orientation. In some embodiments, the user repositions a biasing element to select whether the locking differential is in the first orientation or the second orientation. In some embodiments, the user positions a biasing element between the housing and the cage such that the locking differential is in the first orientation. In some embodiments, the user positions a biasing element between the cog and an endplate such that the locking differential is in the second orientation. The locking differential can include two inlets. In some embodiments, the user couples one inlet to a fluid source to select whether the locking differential is in the first orientation or the second orientation. In some embodiments, the fluid overcomes the force of a biasing element. In some embodiments, the fluid causes the longitudinal sliding of the ring, the cog, and the cage. In some embodiments, the user couples a manual locking bar to the locking differential to select whether the locking differential is locked or unlocked. In some embodiments, the manual locking bar can be used whether the locking differential is the first orientation or the second orientation. In some embodiments, the locking differential is actuated by fluid. In some embodiments, the fluid is gas. In some embodiments, the fluid is liquid. In some embodiments, the user couples a manual locking bar to the locking differential to select whether the locking differential is locked or unlocked. In some embodiments, the manual locking bar can be coupled to the ring, such that linear motion of the locking bar is transmitted to linear motion of the ring. In some embodiments, the manual locking bar comprises a handle and a spacer, wherein the user can engage the spacer to maintain the position of the manual locking bar.

In some embodiments, a locking differential is provided. The locking differential can include a planetary gear train. In some embodiments, a locking differential is provided. The locking differential can include a cage, wherein the cage surrounds at least a portion of the planetary gear train. In some embodiments, a locking differential is provided. The locking differential can include a cog coupled to a first end of the cage. In some embodiments, a locking differential is provided. The locking differential can include a shaft coupled to a second end of the cage. In some embodiments, the locking differential has a first orientation and a second orientation, wherein the locking differential is unlocked and must be actuated to be locked in the first orientation, and wherein the locking differential is locked and must be actuated to be unlocked in the second orientation.

The locking differential can include an endplate, wherein the cog is configured to slide relative to the endplate. In some embodiments, the endplate is a unitary structure. In some embodiments, the endplate is configured to be load bearing when the locking differential is locked. In some embodiments, the endplate is shallow. The locking differential can include a biasing element between a housing and the cage such that the locking differential is in the first orientation. In some embodiments, in the first orientation a bearing surface of the cog is biased away from a bearing surface of a gear in the planetary gear train. The locking differential can include a biasing element between the cog and an endplate such that the locking differential is in the second orientation. In some embodiments, the second orientation a bearing surface of the cog is biased toward a bearing surface of a gear in the planetary gear train. The locking differential can include a first inlet and a second inlet, wherein the first inlet is configured to permit the flow of fluid to actuate the locking differential in the first orientation and the second inlet is configured to permit the flow of fluid to actuate the locking differential in the second orientation. In some embodiments, the cog further comprises dogs configured to engage a gear of the planetary gear train. The locking differential can include a screw disposed between a front cover and the shaft, wherein the screw is configured to be rotated to translate the shaft.

In some embodiments, a method of using a locking differential is provided. The method can include the step of positioning a spring in a first position such that the locking differential is unlocked and must be actuated to be locked. The method can include the step of engaging a gear of a planetary gear train to lock the locking differential.

The method can include the step of positioning the spring in a second position such that the locking differential is locked and must be actuated to be unlocked. The method can include the step of disengaging the gear of the planetary gear train to unlock the locking differential. The method can include the step of sliding a cog within an endplate to engage and disengage the gear. The method can include the step of applying fluid to a first inlet to engage the gear of the planetary gear train. The method can include the step of applying fluid to a second inlet to disengage the gear of the planetary gear train. In some embodiments, the spring in the first position bias a cog toward an endplate. In some embodiments, the spring in the second position bias a cog toward the gear of the planetary gear train. The method can include the step of manually actuating a shaft to overcome the biasing force of the spring. In some embodiments, manually actuating the shaft further comprises rotating a screw to translate the shaft. In some embodiments, manually actuating the handle further comprises pulling the shaft.

In some embodiments, a method of using a locking differential is provided. The method can include the step of positioning a spring in a first position such that the locking differential is unlocked and must be actuated to be locked. The method can include the step of engaging dogs of a cog with a gear of a planetary gear train to lock the locking differential.

The method can include the step of disengaging dogs of a cog with a gear of a planetary gear train to unlock the locking differential. The method can include the step of sliding a cog within an endplate. The method can include the step of applying fluid to a first inlet to lock the locking differential. In some embodiments, the spring in the first position bias a cog toward an endplate. The method can include the step of positioning the spring in a second position such that the locking differential is locked and must be actuated to be unlocked. In some embodiments, the spring in the second position bias a cog toward the gear of the planetary gear train. The method can include the step of applying fluid to a second inlet to unlock the locking differential. The method can include the step of manually actuating a shaft to overcome the biasing force of the spring. In some embodiments, manually actuating the shaft further comprises rotating a screw to translate the shaft. In some embodiments, manually actuating the handle further comprises pulling the shaft.

In some embodiments, a locking differential is provided. The locking differential can include a housing. The locking differential can include a planetary gear train. The locking differential can include a cage, wherein the cage surrounds at least a portion of the planetary gear train. The locking differential can include a cog coupled to a first end of the cage. The locking differential can include an endplate.

The locking differential can include a shaft coupled to a second end of the cage. In some embodiments, the locking differential is unlocked and must be actuated to be locked in a first orientation. In some embodiments, the locking differential is locked and must be actuated to be unlocked in a second orientation. In some embodiments, the cog is configured to slide relative to the endplate. In some embodiments, the endplate is a unitary structure. In some embodiments, the endplate is configured to be load bearing when the locking differential is locked. In some embodiments, the endplate is shallow. The locking differential can include a biasing element between the housing and the cage. In some embodiments, a bearing surface of the cog is biased away from a bearing surface of a gear in the planetary gear train. The locking differential can include a biasing element between the cog and an endplate. In some embodiments, a bearing surface of the cog is biased toward a bearing surface of a gear in the planetary gear train. The locking differential can include a first inlet and a second inlet, wherein the first inlet and the second inlet are configured to permit the flow of fluid to actuate the locking differential. In some embodiments, the cog further comprises dogs configured to engage a gear of the planetary gear train. The locking differential can include a shaft coupled to the second end of the cage. The locking differential can include a screw coupled to the shaft, wherein the screw is configured to be rotated to translate the shaft. In some embodiments, the cog is configured to engage a gear in the planetary gear train such that the locking differential is locked. In some embodiments, the cog is configured to disengage a gear in the planetary gear train such that the locking differential is unlocked. In some embodiments, the cog and the cage are configured to slide longitudinally relative to the housing and the endplate. The locking differential can include a shaft configured to slide the cog longitudinally relative to the endplate. The locking differential can include a shaft configured to slide the cage longitudinally relative to the housing. In some embodiments, the cog comprises ridges to engage the endplate and dogs to engage a gear in the planetary gear train. In some embodiments, the dogs are perpendicular to the ridges. In some embodiments, the second end of the cage extends through openings in the housing. The locking differential can include a ring coupled to the second end of the cage. The locking differential can include at least one fastener that couples the ring to the second end of the cage, wherein the fasteners extend perpendicular to a longitudinal axis of the cage. The locking differential can include a shaft coupled to the ring.

BRIEF DESCRIPTION OF THE DRAWINGS

These and other features, aspects and advantages of the present invention are described herein with reference to drawings of certain preferred embodiments, which are provided for the purpose of illustration and not limitation. The drawings contain twenty-seven (27) figures.

DETAILED DESCRIPTION OF THE PREFERRED EMBODIMENT

Figure 1:
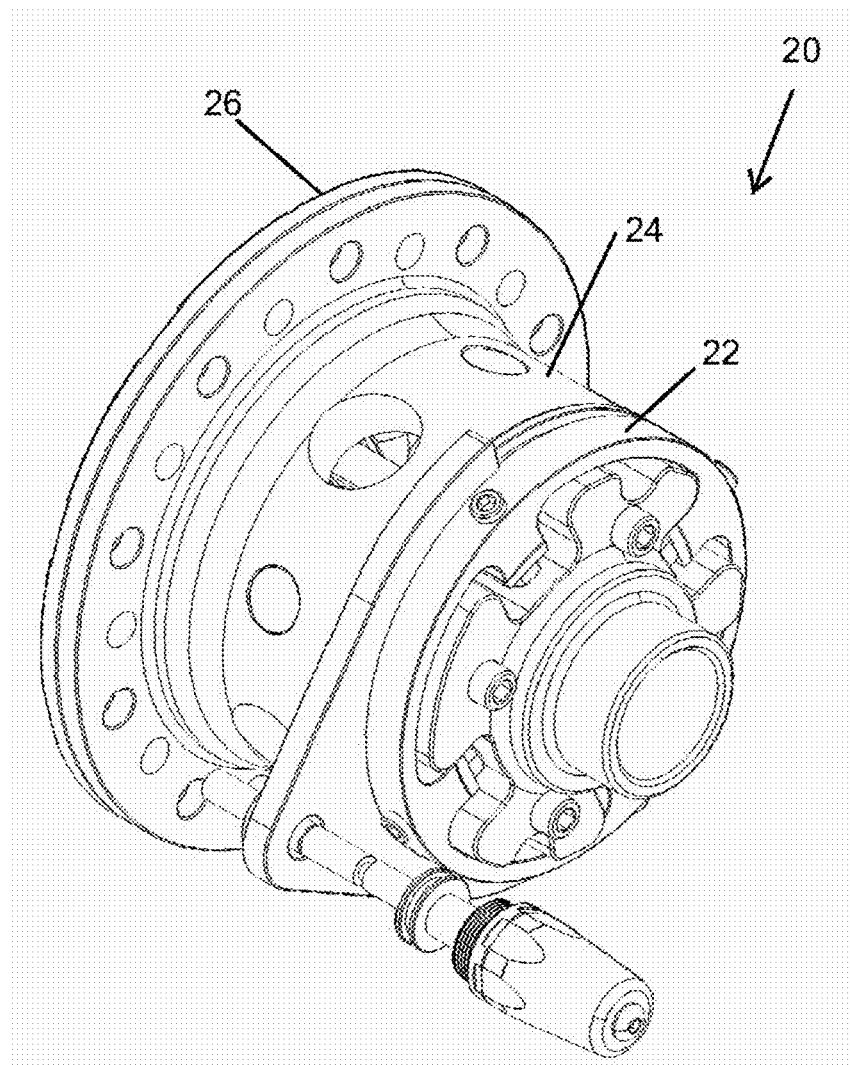
FIG. 1 is a perspective view of a locking differential.
Figure 2:
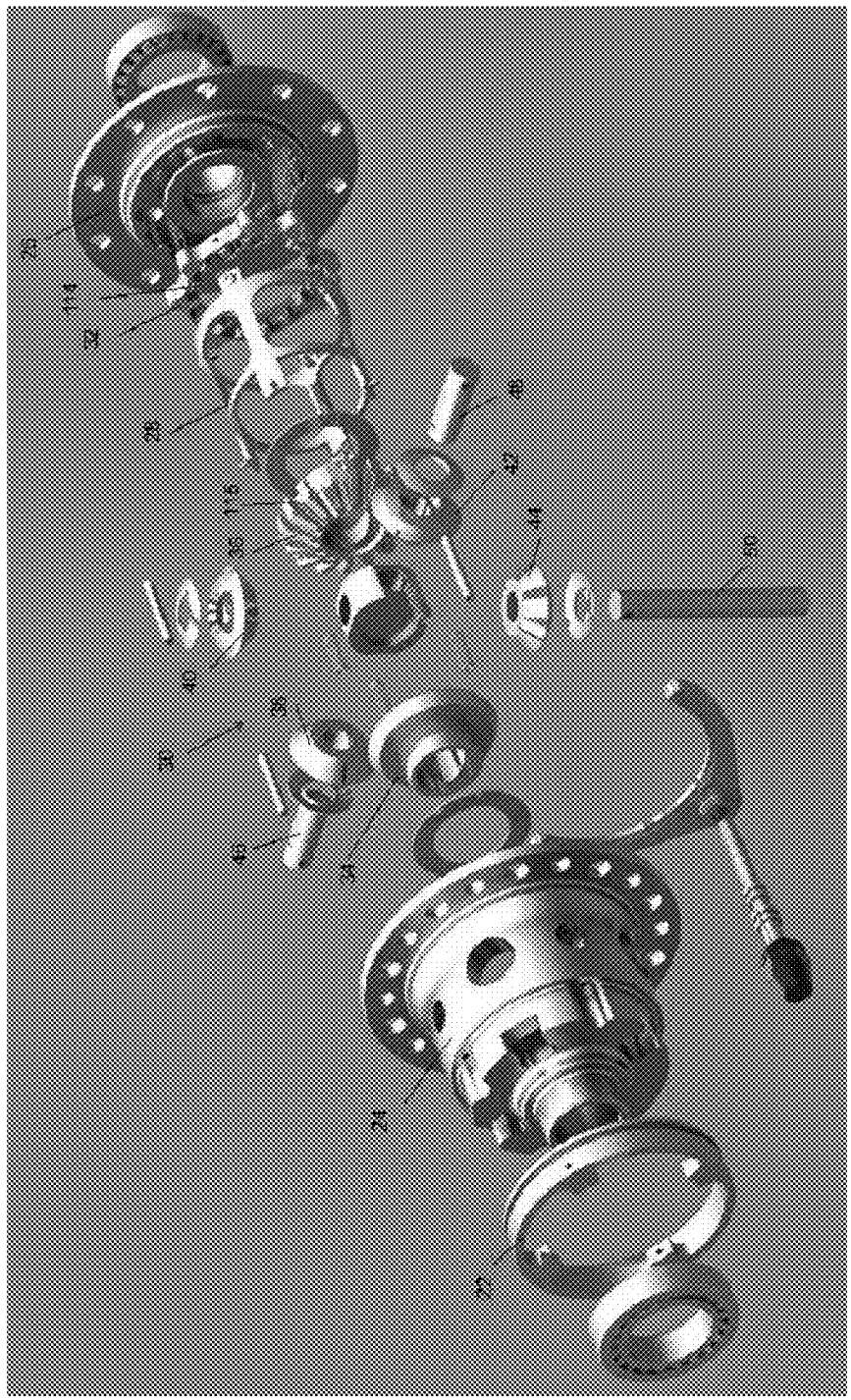
FIG. 2 is an exploded view of the locking differential of FIG. 1.

The illustrated locking differential 20 shown in FIGS. 1 and 2 permits the locking of the locking differential 20 by engaging or disengaging a cog with a gear of the planetary gear train. The locking or unlocking can be controlled outside the locking differential and, in some embodiments, within the vehicle, for example through a switch or other mechanism accessible to the driver (e.g., within the cab of the vehicle). The locking differential 20 can be activated by fluid (e.g., gas, liquid) or electronically (e.g., solenoid). When the cog is engaged with the gear, the shafts coupled to the wheels of the vehicle are locked together for rotation and the wheels will rotate at the same speed. When the cog is disengaged from the gear, the shafts coupled to the wheels of the vehicle are unlocked and the wheels will rotate independently of each other.

The illustrated locking differential 20 provides ease of use features including the ability of the user to select a default position of the locking differential 20 based on user preferences. In other words, the locking differential 20 can be considered a dual orientation locking differential 20. If the user typically drives under normal conditions, then the default position can be selected such that the locking differential 20 is unlocked or open, which allows the wheels to rotate at different speeds. If the user typically drives off-road or other specialty circumstances, then the default position can be selected such that the locking differential 20 is locked, which causes the wheels to rotate at the same speed.

The selection of the default position enables the user to rely less on the activation mechanism that switches between the locked and the unlocked position of the locking differential 20. For instance, if the user prefers a locked differential, but locking requires activation, the user must rely on the activation mechanism to maintain the locked position. Similarly, if the user prefers an unlocked differential but unlocking requires activation, the user must rely on the activation mechanism to maintain the unlocked position. By establishing the default position to correspond with the preferred position of the locking differential (e.g., locked), the user would rely on the activation mechanism only to switch to the other position (e.g., unlocked). The user would not need to rely on the activation mechanism to maintain the preferred position (e.g., locked). Rather, the locking differential will maintain the default position without relying on the activation mechanism.

Another ease of use feature is the ability to manually lock or unlock the locking differential 20. The locking differential 20 can include a shaft which can be manipulated by the user to overcome the default position. If the chamber that controls the locking differential 20 leaks fluid or otherwise malfunctions, then the user can manually lock or unlock the locking differential 20. If the electrical signal that controls the locking differential 20 loses power or otherwise malfunctions, then the user can manually lock or unlock the locking differential 20.

FIGS. 1 and 2 illustrate a locking differential 20 that is arranged and configured in accordance with certain features, aspects and advantages of the present invention. In the illustrated arrangement, the locking differential 20 includes three segments: the ring 22, the housing 24, and the endplate 26. The housing 24 is coupled to the endplate 26 forming an enclosed space.

The ring 22 is configured to slide longitudinally with respect to the housing 24. The ring 22 is coupled to a cage 28 at a first end of the cage 28. The first end of the cage extends through the housing 24 to engage the ring 22. Thus, while the majority of the cage 28 is positioned within the housing 24, the ring 22 is positioned outside of the housing 24.

In the illustrated embodiment, the cage 28 is a unitary body. The cage 28 can have a generally cylindrical shape, as described herein. The cage 28 can surround a planetary gear train 30. The planetary gear train 30 can have similar functions and characteristics as planetary gear trains known in the art.

The second end of the cage 28 can be coupled to a cog 32. Thus, the cog 32 and the ring 22 are interconnected by the cage 28. The sliding of ring 22, the cage 28, and the cog 32 can cause the locking differential 20 to lock or unlock. In some configurations, as discussed below, the cog 32 can include a bearing surface to engage the endplate 26. The cog 32 can slide linearly with respect to the endplate 26. In some configurations, when the cog 32 is engaged with the endplate 26, the cog 32 can be prevented from significant rotation with respect to the endplate 26.

The cog 32 includes a bearing surface 114 to engage with a bearing surface 115 of the second gear 36 of the planetary gear train 30. The bearing surface 114 of the cog 32 can include a plurality of dogs and the bearing surface 115 of the second gear 36 can include a plurality of dogs. When the bearing surface 114 of the cog 32 is engaged with the bearing surface 115 of the second gear 36 of the planetary gear train 30, the dogs are engaged with each other and the second gear 36 is prevented from significant rotation with respect to the planetary gear train 30. Dogs use rotation to pull themselves into the locked position. The locking forces increase the more they are loaded. Dogs operate differently than splines. Splines operate coaxially and locking forces do not increase when loads increase.

The locking differential 20 is locked when the cog 32 slides relative to the endplate 26 and engages the second gear 36. The locking differential 20 is unlocked when the cog 32 slides relative to the endplate 26 and disengages the second gear 36. Some or all of the components of the locking differential 20 may include bearing surfaces that permit components to longitudinally slide relative to one another.

The locking differential 20 is configured to be coupled to a set of wheels of a vehicle. Each wheel of the set of wheels can be coupled to a shaft. One of the shafts can enter the locking differential 20 through the housing 24. The other shaft can enter the locking differential 20 through the endplate 26. The shaft that enters through the housing 24 will couple to a first gear 34. The shaft that enters through the endplate 26 will couple to the second gear 36. The first gear 34 and the second gear 36 can rotate at different speeds due to the spider gears 38, 40, 42, 44. The illustrated embodiment shows four spider gears 38, 40, 42, 44, but other configurations also can be used. Because the spider gears 38, 40, 42, 44 connect the first gear 34 and the second gear 36 (i.e., rotation of the first gear 34 transfers to the second gear 36 through the spider gears 38, 40, 42, 44 and vice-versa), when both of the first and second gears 34, 36 are able to rotate, the differential is unlocked. If one of the first and second gears 34, 36 is secured against rotation, the locking differential 20 is locked because the first gear 34 cannot rotate independently of the rotation of the second gear 36.

The first gear 34 can include engagement features to facilitate the coupling of the first gear 34 to one of the shafts. The second gear 36 can include engagement features to facilitate the coupling of the second gear 36 to the other shaft. In some embodiments, the engagement features described herein can include gears, teeth, flutes, splines, grooves, channels, keys or any other feature known in the art to couple components. In some embodiments, the engagement features prevent significant rotation of one component relative to another component. In some embodiments, the engagement features support movement of the components while maintaining the engagement of components. For example, the engagement features extend longitudinally, permitting longitudinally sliding of the components relative to each other. In some embodiments, the engagement features are constructed of a material for low sliding resistance and durability.

The planetary gear train 30 includes a first post 46, a second post 48, and a third post 50. In the illustrated embodiment, the first post 46 is coupled to the spider gear 38. The second post 48 is coupled to the spider gear 42. The third post 50 is coupled to the spider gears 40, 44. In the illustrated configuration, the third post 50 spans the planetary gear train 30.

Figure 3:
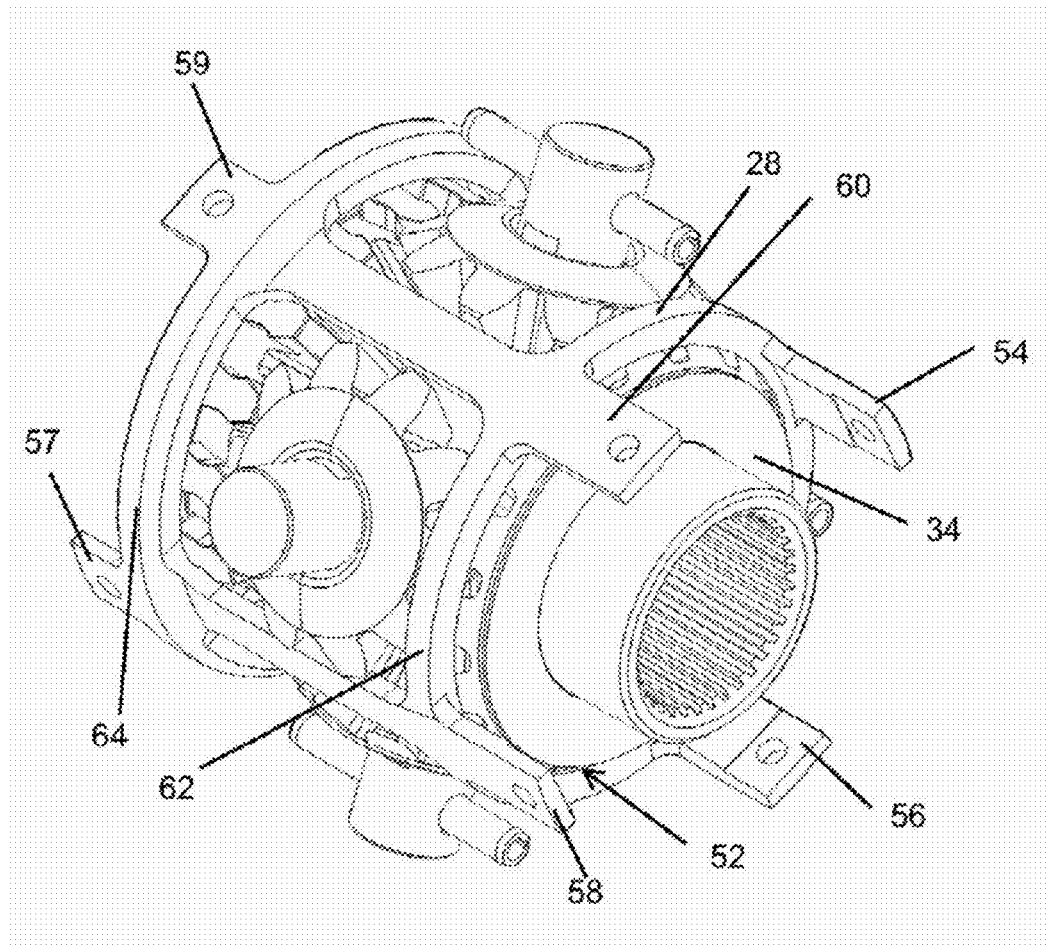
FIG. 3 is a perspective view of a cage and a planetary gear train of FIG. 1.
Figure 4:
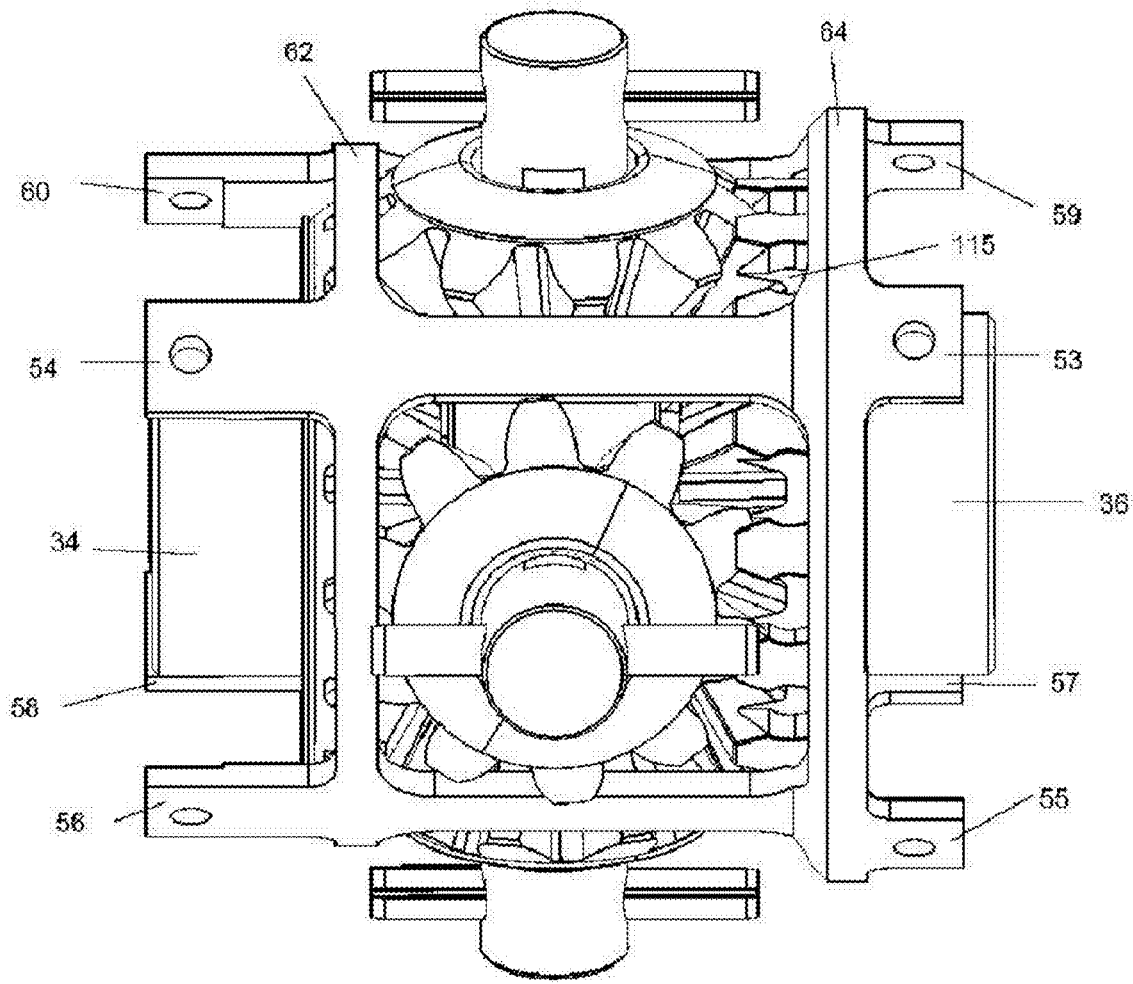
FIG. 4 is a side view of the cage and the planetary gear train of FIG. 1.
Figure 5:
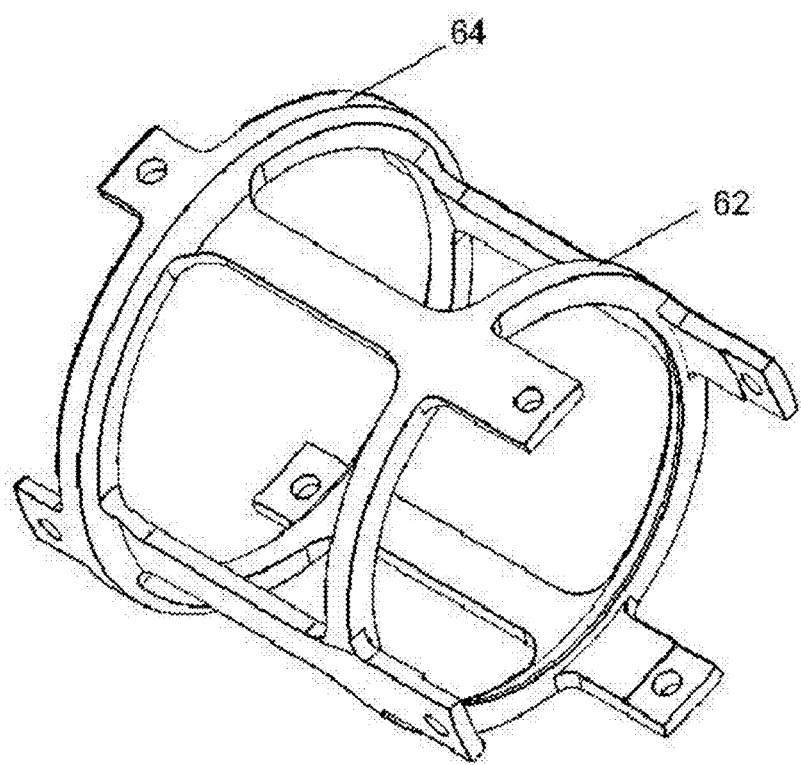
FIG. 5 is a perspective view of the cage of FIG. 1.

FIGS. 3-5 are perspective and side views of the cage 28 and the planetary gear train 30. The cage 28 can include a central lumen 52. The first gear 34 and the second gear 36 can be retained within the central lumen 52. The central lumen 52 can define a circular cross-section to complement the circular cross-section of the first gear 34 and the second gear 36. In some configurations, the central lumen 52, the first gear 34 and the second gear 36 are coaxial. An outer diameter of the central lumen 52 (i.e., an inner diameter of the cage 28) can be larger than the first gear 34 and the second gear 36. The cage 28 can be described as a substantially cylindrical shape with cut-out portions that can be said to define windows. The cage 28 can include a plurality of engagement ends 53, 54, 55, 56, 57, 58, 59, 60. The engagement ends 54, 56, 58, 60 may be disposed on a first end of the cage 28 and the engagement ends 53, 55, 57, 59 may be disposed on a second end of the cage 28. Although four engagement ends are shown on each end of the cage 28, more or fewer engagement ends are contemplated. However, four engagement ends at each end of the cage 28 are advantageous because the engagement ends can be offset from the locations of the spider gears. Although the same number of engagement ends are shown on the first end of the cage 28 and the second end of the cage 28 other configurations are possible (e.g., four engagement ends on the first end and eight engagement ends on the second end).

The cage 28 can include a number of cut-out portions to accommodate the spider gears 38, 40, 42, 44. In some arrangements, each spider gear 38, 40, 42, 44 is arranged in a cut-out portion of the cage 28. For instance, spider gear 40 can be arranged in a cut-out portion of the cage 28. In some arrangements, the first post 46 is extends through a cut-out portion of the cage 28. In some arrangements, the second post 48 can extends through a cut-out portion of the cage 28. In some arrangements, the third post 50 can span the planetary gear train 30 and can extend through a cut-out portion of the cage 28. The first end of the third post 50 can extend through a cut-out portion of the cage 28 and the second end of the third post 50 can extend through another cut-out portion of the cage 28. Other arrangements of posts, spider gears and cut-out portions are contemplated.

In some arrangements, the cut-out portions are offset with the engagement ends 54, 56, 58, 60 disposed on a first end of the cage 28. In some arrangements, the cut-out portions are offset with the engagement ends 53, 55, 57, 59 disposed on a second end of the cage 28. In the illustrated embodiment, the engagement ends 54, 56, 58, 60 are arranged linearly with the engagement ends 53, 55, 57, 59. The engagement ends 54, 56, 58, 60 share a longitudinal axis with the engagement ends 53, 55, 57, 59. In some arrangements, the engagement ends 54, 56, 58, 60 are not arranged linearly with the engagement ends 53, 55, 57, 59.

The cage 28 can include a first circumferential support or ring 62. In some embodiments, the cage 28 includes a plurality of circumferential supports (e.g., the first circumferential support or ring 62 and a second circumferential support or ring 64). In some embodiments, the circumferential supports 62, 64 extend the entire circumference of the cage 28. In other embodiments, the circumferential supports 62, 64 extend around only a portion of the circumference of the cage 28, thereby forming an arc (not shown).

In the illustrated arrangement, the circumferential supports 62, 64 are offset from the ends of the cage 28 such that the engagement ends 53, 54, 55, 56, 57, 58, 59, 60 extend beyond the circumferential supports 62, 64. The engagement ends 54, 56, 58, 60 extend beyond the circumferential supports 62. The engagement ends 54, 56, 58, 60 can be coupled to the ring 22, as described herein. The engagement ends 53, 55, 57, 59 extend beyond the circumferential supports 64. The engagement ends 53, 55, 57, 59 can be coupled to the cog 32, as described herein.

Figure 6:
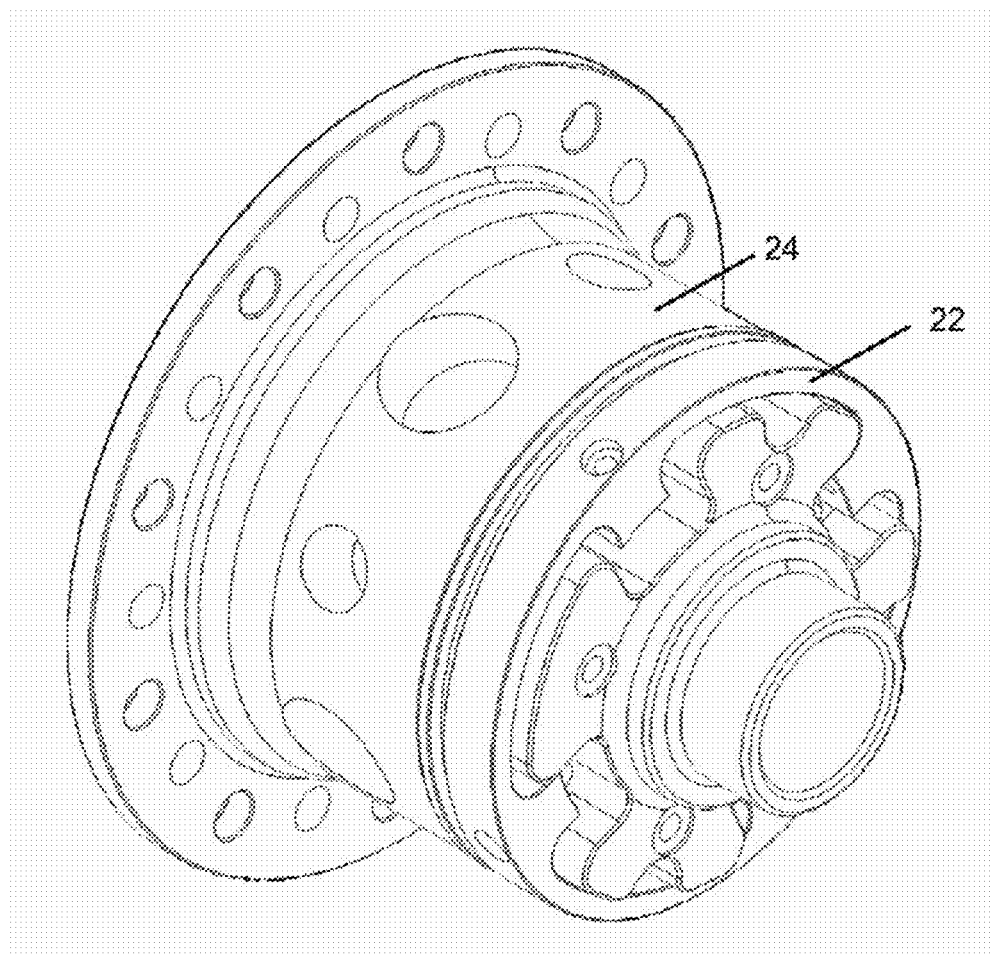
FIG. 6 is a perspective view of a ring and a housing of FIG. 1.
Figure 7:
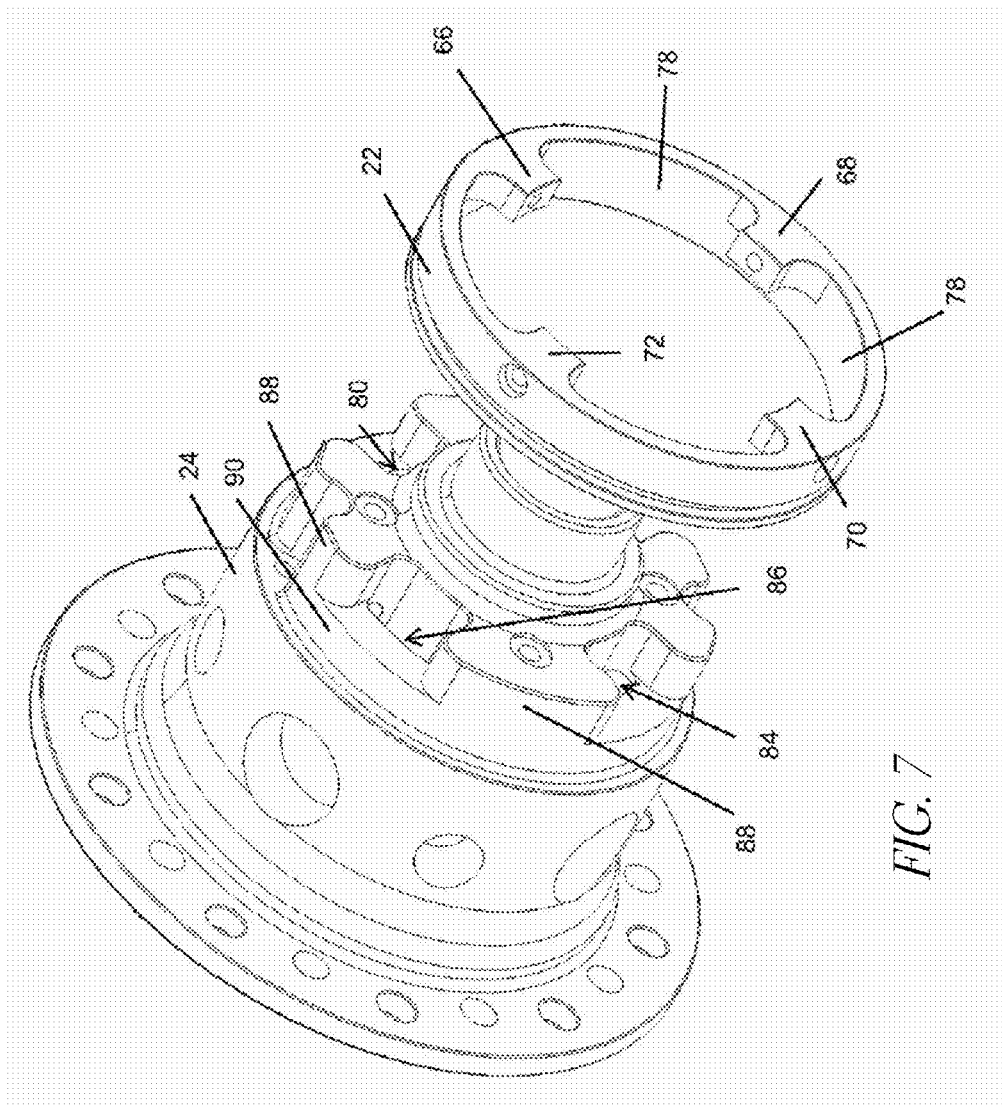
FIG. 7 is an exploded view of the ring and the housing of FIG. 1.

FIGS. 6 and 7 are perspective and exploded views of the ring 22 and the housing 24. The ring 22 can include supports 66, 68, 70, 72 that extend inward toward the center of the ring 22. In some configurations, the supports 66, 68, 70, 72 have an axial dimension that is less than an axial span of the ring 22 that surrounds the supports 66, 68, 70, 72. The supports 66, 68, 70, 72 can be substantially the same size as the engagement ends 54, 56, 58, 60. The illustrated embodiment shows four supports 66, 68, 70, 72 corresponding to four engagement ends 54, 56, 58, 60. Other configurations including more or fewer engagement ends and supports are contemplated.

In the illustrated configuration, each support 66, 68, 70, 72 includes an engagement surface configured to abut the corresponding engagement ends 54, 56, 58, 60. In some embodiments, the engagement surface can be concave to engage the convex surface of the engagement ends 54, 56, 58, 60. Each support 66, 68, 70, 72 can include a hole. The holes extend radially toward the center of the ring 22. The ring 22 includes a bearing surface 78 extending between the supports 66, 68, 72, 70. In the illustrated embodiment, the bearing surface 78 is substantially circular but other shapes are contemplated. The bearing surface 78 can include four arced segments between the supports 66, 68, 72, 70.

The housing 24 can include openings 80, 82, 84, 86 that permit the corresponding engagement ends 54, 56, 58, 60 to pass through the openings 80, 82, 84, 86. In some configurations, the openings 80, 82, 84, 86 are slots. The openings 80, 82, 84, 86 can be substantially the same size as the engagement ends 54, 56, 58, 60. The illustrated embodiment shows four openings 80, 82, 84, 86 corresponding to four engagement ends 54, 56, 58, 60. Other configurations including more or fewer engagement ends and openings are contemplated. The housing 24 includes a bearing surface 88 configured to abut the bearing surface 78 of the ring 22. In the illustrated embodiment, the bearing surface 88 is substantially circular but other shapes are contemplated. The bearing surface 88 can be disposed between the openings 80, 82, 84, 86. The bearing surface 88 can include four arced segments, some of which may be interrupted arced segments. In some configurations, the interruptions along the bearing surface 88 can define voids that receive the supports 66, 68, 70, 72 in one axial position of the moveable ring 22. The bearing surface 88 permits the bearing surface 78 of the ring 22 to slide longitudinally (i.e., axially) along the surface of the housing 24. The housing 24 can include a stop 90 that reduces or eliminates the likelihood of further longitudinal movement of the ring 22 relative to the housing 24.

Figure 8:
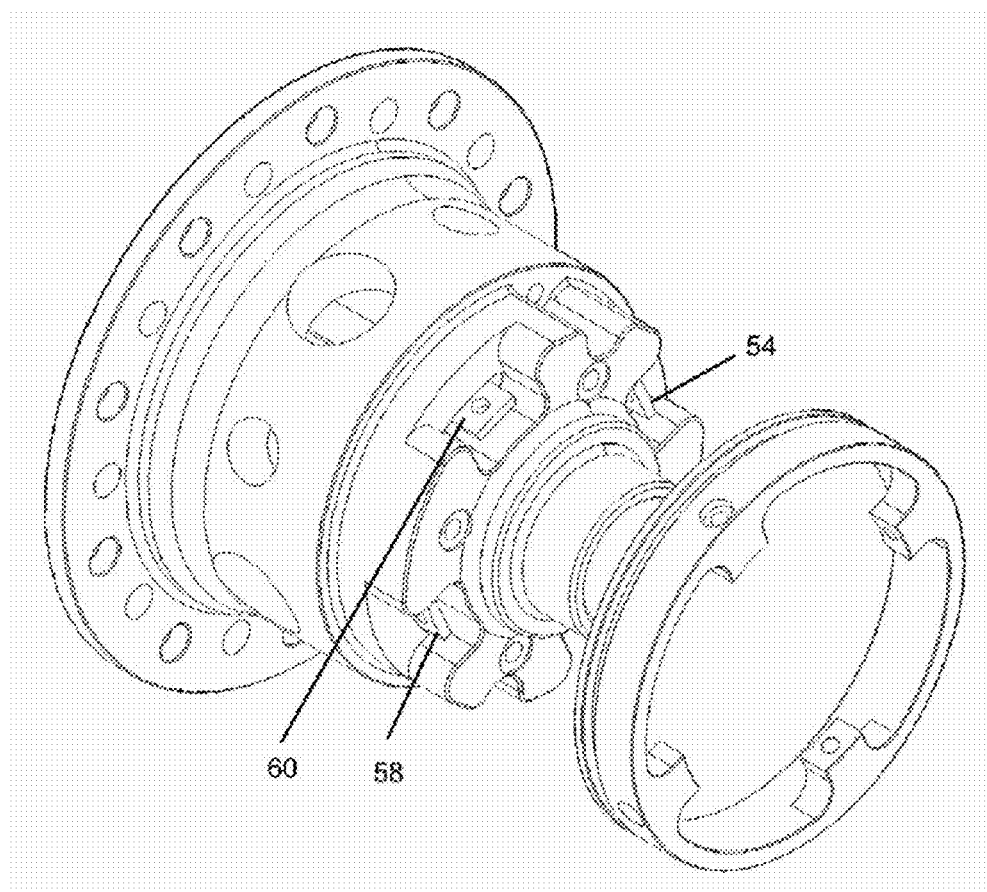
FIG. 8 is a perspective view of the cage extending through the housing of FIG. 1.
Figure 9:
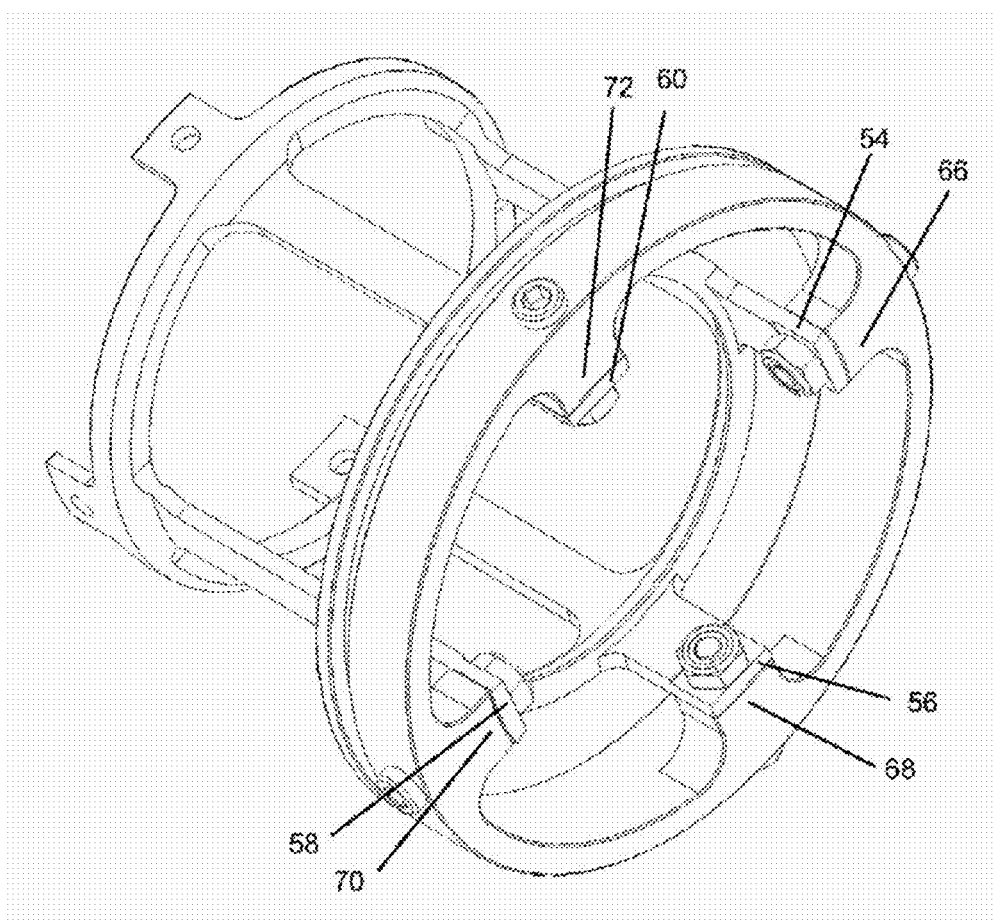
FIG. 9 is a perspective view of the cage coupled to the ring of FIG. 1.
Figure 10:
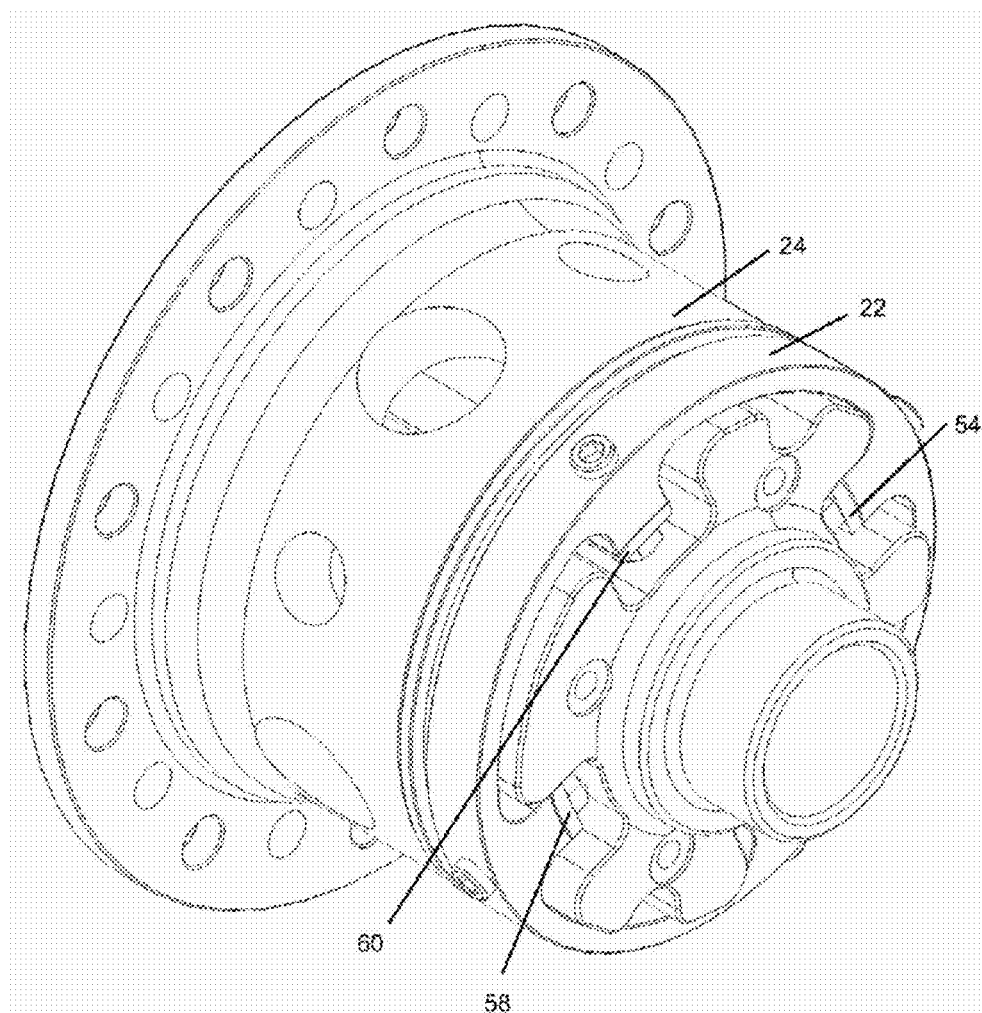
FIG. 10 is a perspective view of the cage, the ring and the housing of FIG. 1.

FIGS. 8-10 are perspective views of the cage 28, the ring 22, and the housing 24 of FIG. 1. The engagement ends 54, 56, 58, 60 can extend through the openings 80, 82, 84, 86 in the housing 24. The ring 22 can be mounted on the housing 24 such that the bearing surfaces 78, 88 engage. The engagement ends 54, 56, 58, 60 can be aligned with the supports 66, 68, 70, 72 of the ring 22. The engagement ends 54, 56, 58, 60 can be coupled to the supports 66, 68, 70, 72 of the ring 22 by fasteners. In the illustrated embodiment, the fasteners are threaded fasteners, but other fasteners such rivets are possible. Each fastener extends through a hole in the engagement ends 54, 56, 58, 60 and engages a longitudinally extending hole in the support 66, 68, 70, 72.

Based on the configuration of the fasteners relative to the ring 22 and the engagement ends 54, 56, 58, 60, the fasteners will undergo shear loading instead of axial loading. The fasteners extend in a direction perpendicular to the direction of loading. The engagement ends 54, 56, 58, 60 do not needed to be precisely machined in order to couple to the fasteners. The ring 22 does not need to be precisely machined in order to couple to the fasteners.

Figure 11:
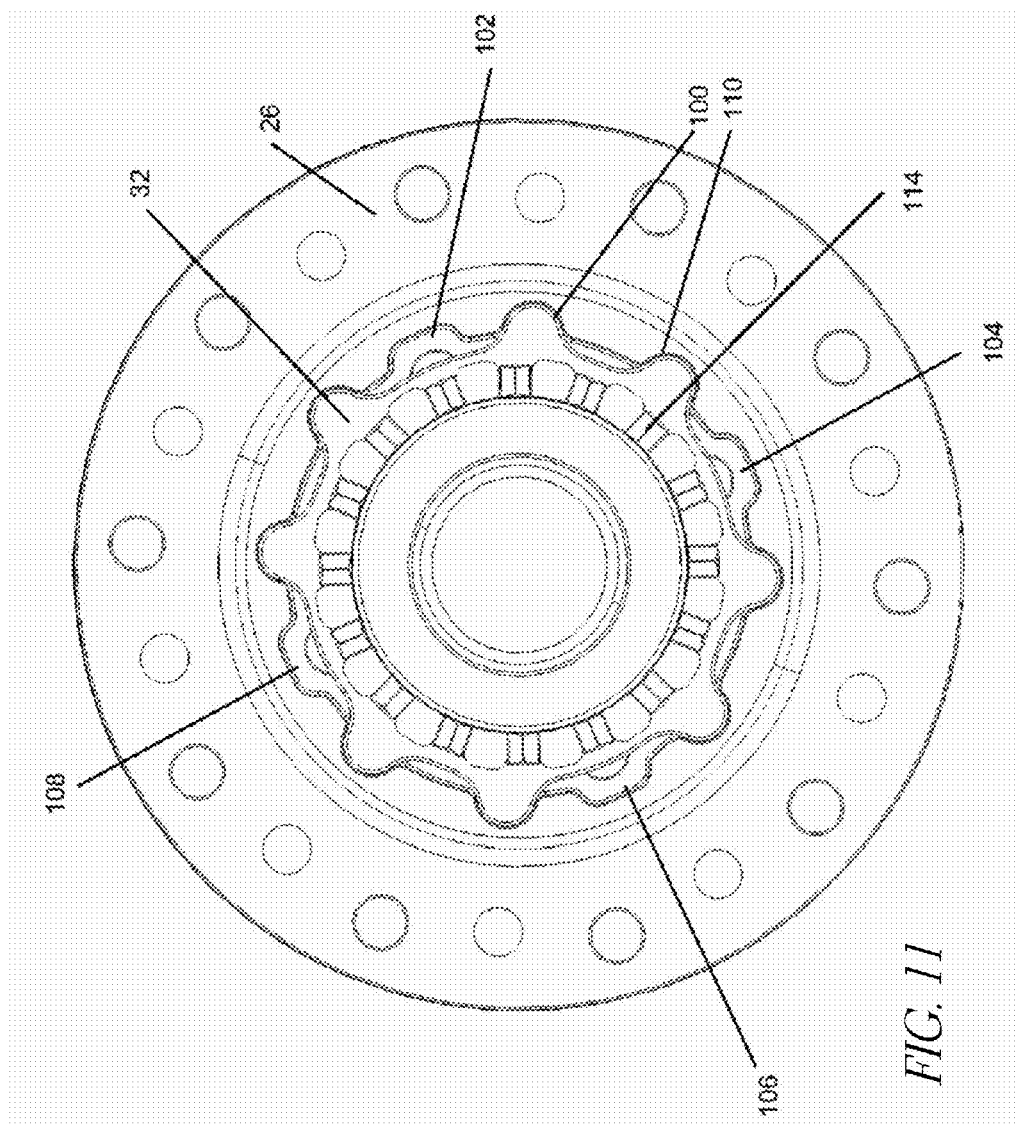
FIG. 11 is a front view of a cog and an endplate of FIG. 1.
Figure 12:
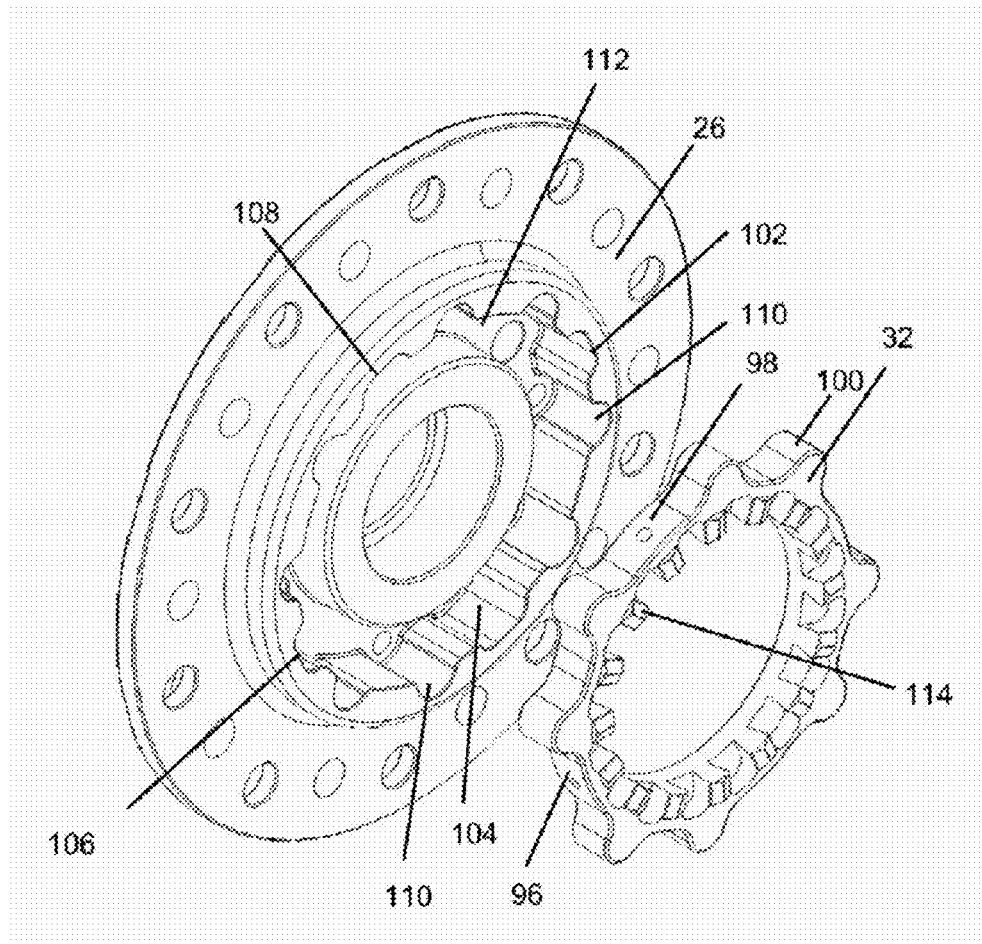
FIG. 12 is an exploded view of the cog and the endplate of FIG. 1.
Figure 13:
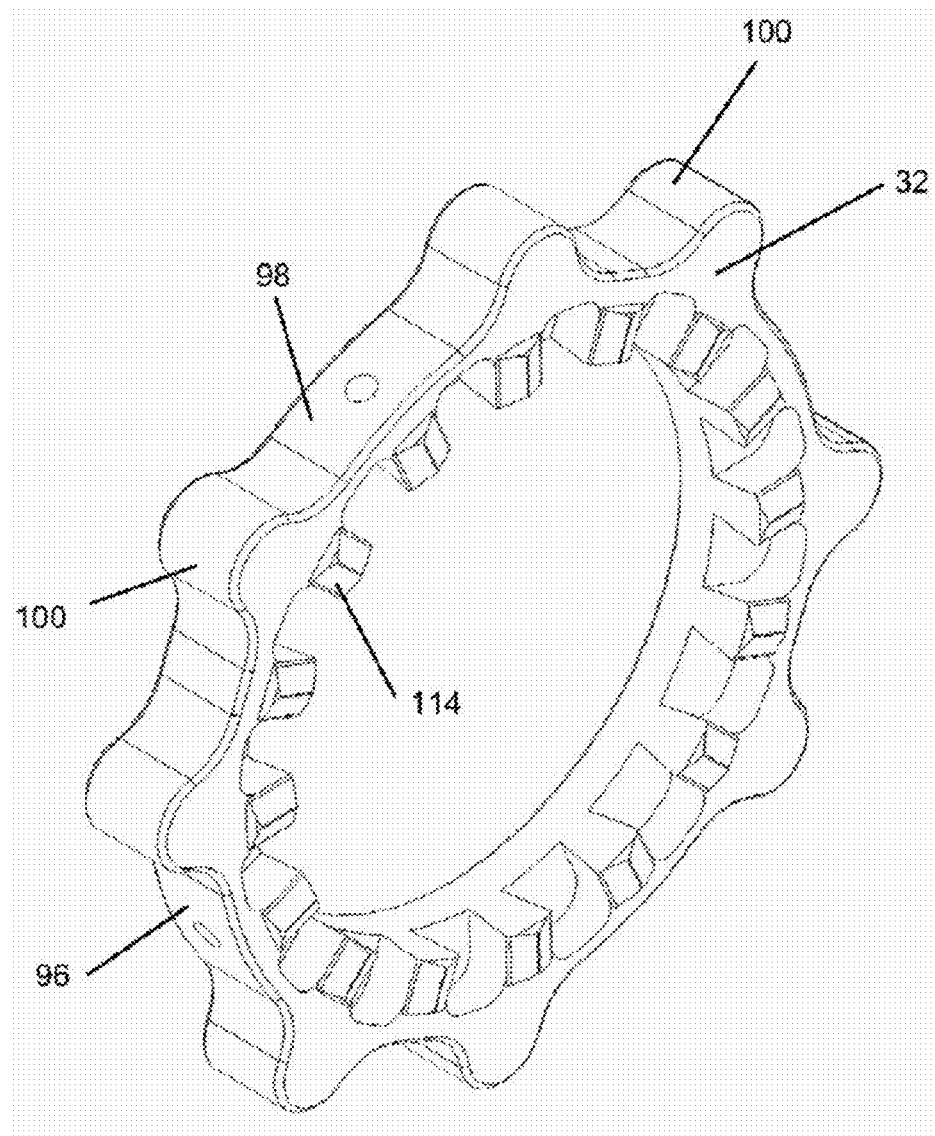
FIG. 13 is a perspective view of the cog of FIG. 1.

FIGS. 11-13 are front, perspective, and exploded views of the cog 32 and the endplate 26. The cog 32 can include supports 92, 94, 96, 98 that extend along an outer surface of the cog 32. The supports 92, 94, 96, 98 can be substantially the same size as the engagement ends 53, 55, 57, 59. The illustrated embodiment shows four supports 92, 94, 96, 98 corresponding to four engagement ends 53, 55, 57, 59. Other configurations including more or fewer engagement ends and supports are contemplated. Each support 92, 94, 96, 98 includes an engagement surface configured to abut the corresponding engagement ends 53, 55, 57, 59. In some embodiments, the engagement surface can be convex to engage the concave surface of the engagement ends 53, 55, 57, 59. In some embodiments, the supports 92, 94, 96, 98 of the cog 32 engage the inner surface of the engagement ends 53, 55, 57, 59. As mentioned herein, the supports 66, 68, 72, 70 of the ring 22 engage the outer surface of the engagement ends 54, 56, 58, 60 as shown in FIG. 9. Other arrangements are contemplated, such as the cog 32 engaging the outer surface of the engagement ends 53, 55, 57, 59 and/or the ring 22 engaging the inner surface of the engagement ends 54, 56, 58, 60.

Each support 92, 94, 96, 98 can include a hole. The holes extend radially toward the center of the cog 32. In the illustrated embodiment, the holes are not through holes but other configurations are possible. The hole is configured to receive a fastener. In the illustrated embodiment, the fasteners are threaded fasteners, but other fasteners can be used. Each fastener extends through a hole in the ends of the engagement ends 53, 55, 57, 59 and engages a longitudinally extending hole in the support 92, 94, 96, 98. The fastener couples the engagement ends 53, 55, 57, 59 to the cog 32.

Based on the configuration of the fasteners relative to the cog 32 and the engagement ends 53, 55, 57, 59, the fasteners will undergo shear loading instead of axial loading. The fasteners extend in a direction perpendicular to the direction of loading. The engagement ends 53, 55, 57, 59 do not needed to be precisely machined in order to couple to the fasteners. The cog 32 does not need to be precisely machined in order to couple to the fasteners.

The cog 32 includes a bearing surface 100 extending between the supports 92, 94, 96, 98. In the illustrated embodiment, the bearing surface 100 includes a plurality of ridges configured to engage the endplate 26. The bearing surface 100 can include two ridges associated with each support 92, 94, 96, 98.

The endplate 26 can include a bearing surface 110 configured to abut the bearing surface 100 of the cog 32. In the illustrated embodiment, the bearing surface 110 comprises a plurality of recesses configured to engage the plurality of ridges of the cog 32. The bearing surface 110 permits the bearing surface 100 of the cog 32 to slide longitudinally (i.e., axially) along the surface of the endplate 26. The endplate 26 includes a stop 112 that prevents further axial movement of the cog 32. The bearing surface 110 prevents rotation of the cog 32 relative to the endplate 26 when the cog 32 is received within the recess of the endplate 26.

The endplate 26 can include recesses 102, 104, 106, 108 that reduce or eliminate the likelihood of interference of the engagement ends 53, 55, 57, 59 with the endplate 26. The recesses 102, 104, 106, 108 can be substantially the same size as the engagement ends 53, 55, 57, 59. The illustrated embodiment shows four recesses 102, 104, 106, 108 corresponding to four engagement ends 53, 55, 57, 59. Other configurations including more or fewer engagement ends and recesses are contemplated. The recesses 102, 104, 106, 108 in the endplate 26 accommodate the engagement ends 53, 55, 57, 59 when the cage 28 is coupled to the cog 32. The bearing surface 110 can be disposed between the recesses 102, 104, 106, 108.

The cog 32 can include the bearing surface 114 configured to engage the bearing surface 115 of the second gear 36. The bearing surface 114 of the cog 32 can include a plurality of dogs. The dogs can extend perpendicular to the plurality of ridges that engage the endplate 26. The bearing surface 114 can be perpendicular to the bearing surface 100. The bearing surface 115 of the second gear 36 can include a plurality of dogs. The cog 32 engages the second gear 36 of the planetary gear train 30 to prevent significant rotation of the planetary gear train 30. The cog 32 engages the second gear 36 of the planetary gear train 30 to lock the locking differential 20. The cog 32 disengages the second gear 36 of the planetary gear train 30 to unlock the locking differential 20. In some arrangements, the cog 32 is retained within the endplate 26 in both the locked and unlocked position. The bearing surface 100 of the cog 32 engages the bearing surface 110 of the endplate 26 to permit sliding of the cog 32 toward and/or away from the second gear 36.

Figure 14:
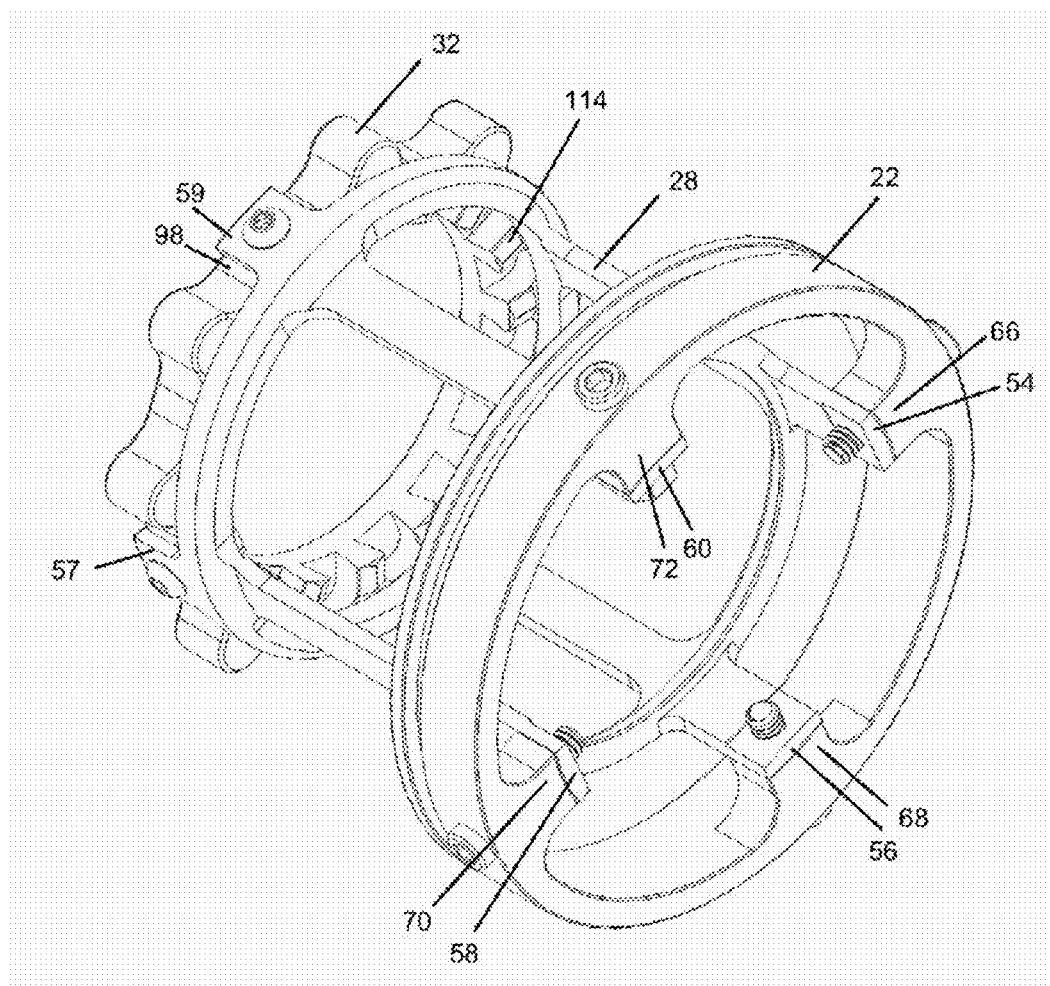
FIG. 14 is a perspective view of the cog, the cage, and the ring coupled of FIG. 1.

FIG. 14 is a perspective view of the ring 22, the cage 28 and the cog 32 of FIG. 1. As mentioned herein, the engagement ends 54, 56, 58, 60 can be aligned with the supports 66, 68, 70, 72 of the ring 22. The engagement ends 54, 56, 58, 60 can be coupled to the supports 66, 68, 70, 72 of the ring 22 by fasteners. The engagement ends 53, 55, 57, 59 can be aligned with the supports 92, 94, 96, 98 of the cog 32. The engagement ends 53, 55, 57, 59 can be coupled to the supports 92, 94, 96, 98 of the cog 32 by fasteners. The cog 32, the cage 28, and the ring 22 form a rigid body, such that movement of the ring 22 causes movement of the cog 32 and movement of the cog 32 causes movement of the ring 22.

Referring to FIGS. 8, 12 and 14, the cage 28 is coupled to the ring 22 and the cog 32. The ring 22, the cage 28, and the cog 32 are constrained from rotating with respect to the endplate 26. The bearing surface 100 of the cog 32 is configured to interlock with the bearing surface 110 of the endplate 26 to permit longitudinal sliding of the cog 32 and prevent rotation of the cog 32. The endplate 26 is coupled to the housing 24. The ring 22, the cage 28, and the cog 32 are constrained from rotating with respect to the housing 24 due in part to the bearing surfaces 100, 110. In the illustrated embodiment, the ring 22 is prevented from rotating with respect to the housing 24 due in part to the shape of the housing 24 and the shape of the ring 22. In the illustrated embodiment, the cage 28 is prevented from rotating with respect to the housing 24 due in part to the shape of the openings 80, 82, 84, 86 through which the engagement ends 54, 56, 58, 60 are inserted. The ring 22, the cage 28 and the cog 32 are prevented from rotating with respect to the housing 24 and the endplate 26, when the ring 22, the cage 28 and the cog 32 are coupled.

The ring 22, the cage 28, and the cog 32 can slide axially relative to the housing 24 and the endplate 26. The bearing surface 78 of the ring 22 can slide relative to the bearing surface 88 of the housing 24. As the ring 22 slides relative to the housing 24, the cage 28 slides relative to the housing 24 through the openings 80, 82, 84, 86. As the ring 22 slides relative to the housing 24, the cog 32 slide relative to the housing 24. The bearing surface 100 of the cog 32 can slide relative to the bearing surface 110 of the endplate 26. As the cog 32 slides relative to the endplate 26, the cage 28 and the ring 22 slides relative to the endplate 26.

The components of the locking differential 20 may be constructed of any suitable material and by any suitable manufacturing process. However, in some embodiments, the components of the locking differential 20 are constructed from suitable metal materials (e.g., steel materials). The components can be shaped by any suitable process.

The cage 28, the housing 24, and/or the ring 22 can be made out of a material that does not need to be hardened. The cage 28, the housing 24, and the ring 22 do not experience the load of the locking assembly. The cage 28, and/or the housing 24, and/or the ring 22 can be made out of a casting and then machined. Based on the configuration disclosed herein, components such as the ring 22, the housing 24 and the cage 28 are not significantly load bearing, and therefore can be made from less material and/or cheaper material. This may reduce the cost of production.

All of the locking load can be carried in the endplate 26. The endplate 26 can be hardened. The endplate 26 is configured to be load bearing to withstand the forces related to the rotation of one wheel shaft relative to the other wheel shaft when the cog 32 engages the second gear 36. The endplate 26 is much easier to machine than the housings of the prior art housings because it is shallow. Moreover, less material is required to be hardened and then machined.

Figure 15:
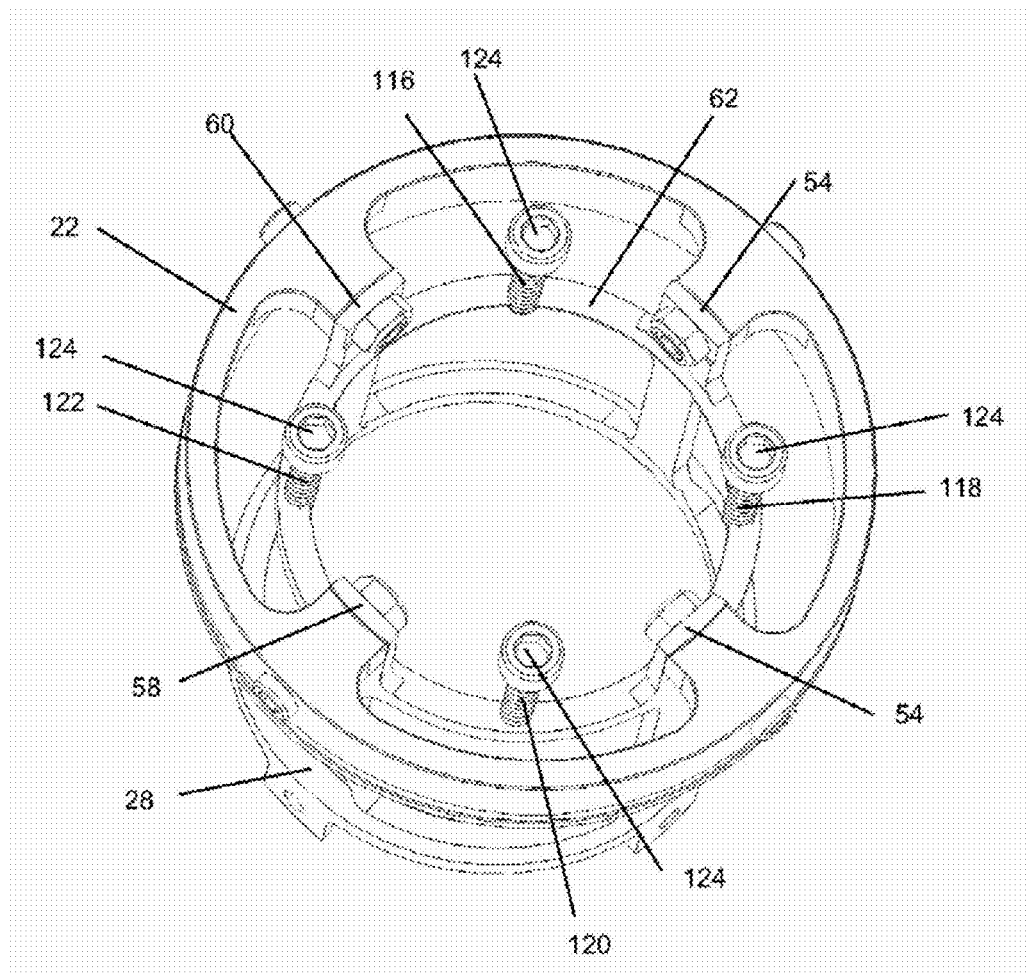
FIG. 15 is a perspective view of the first orientation of the locking differential of FIG. 1.
Figure 16:
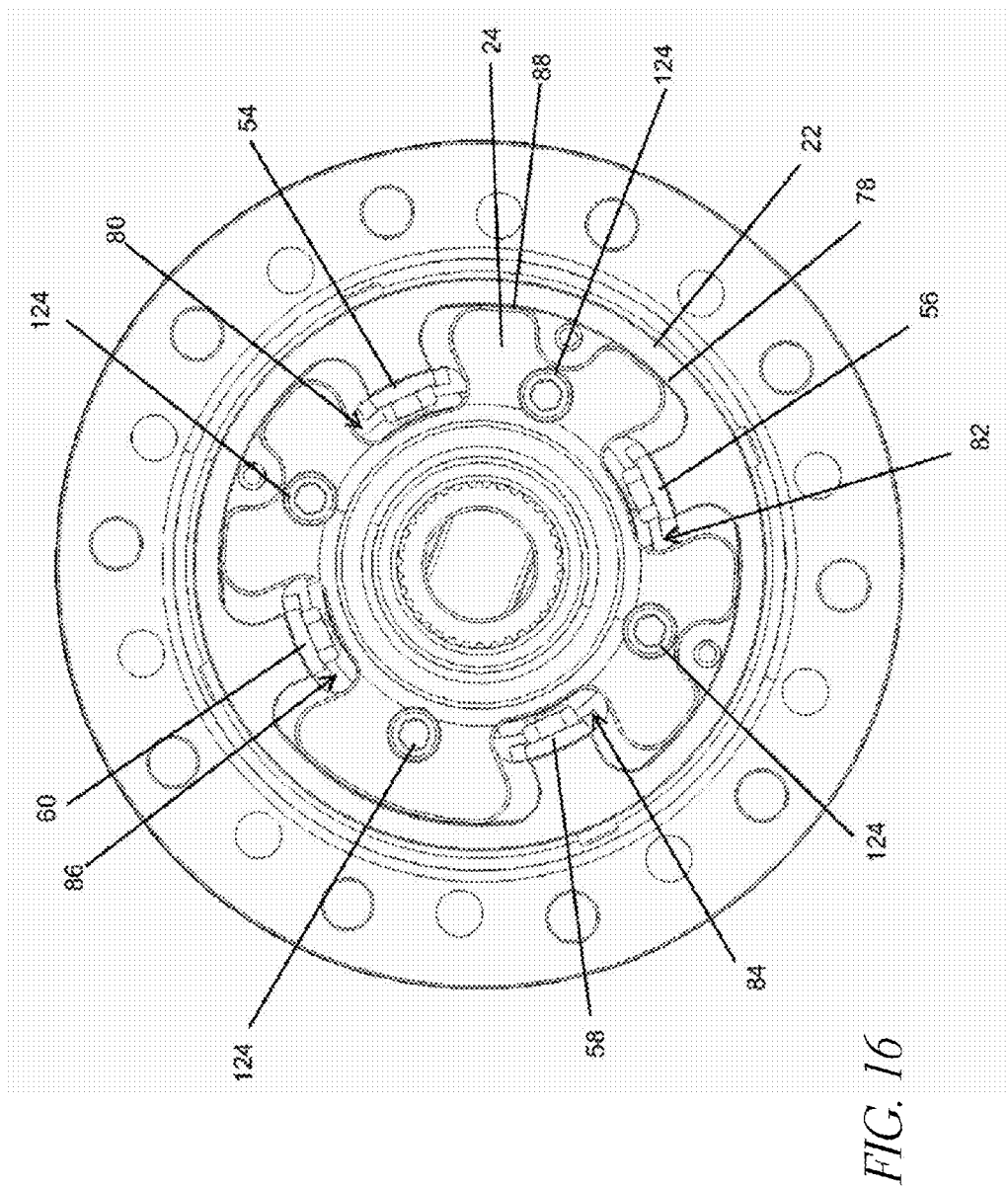
FIG. 16 is a front view of a first orientation of the locking differential of FIG. 1.
Figure 17:
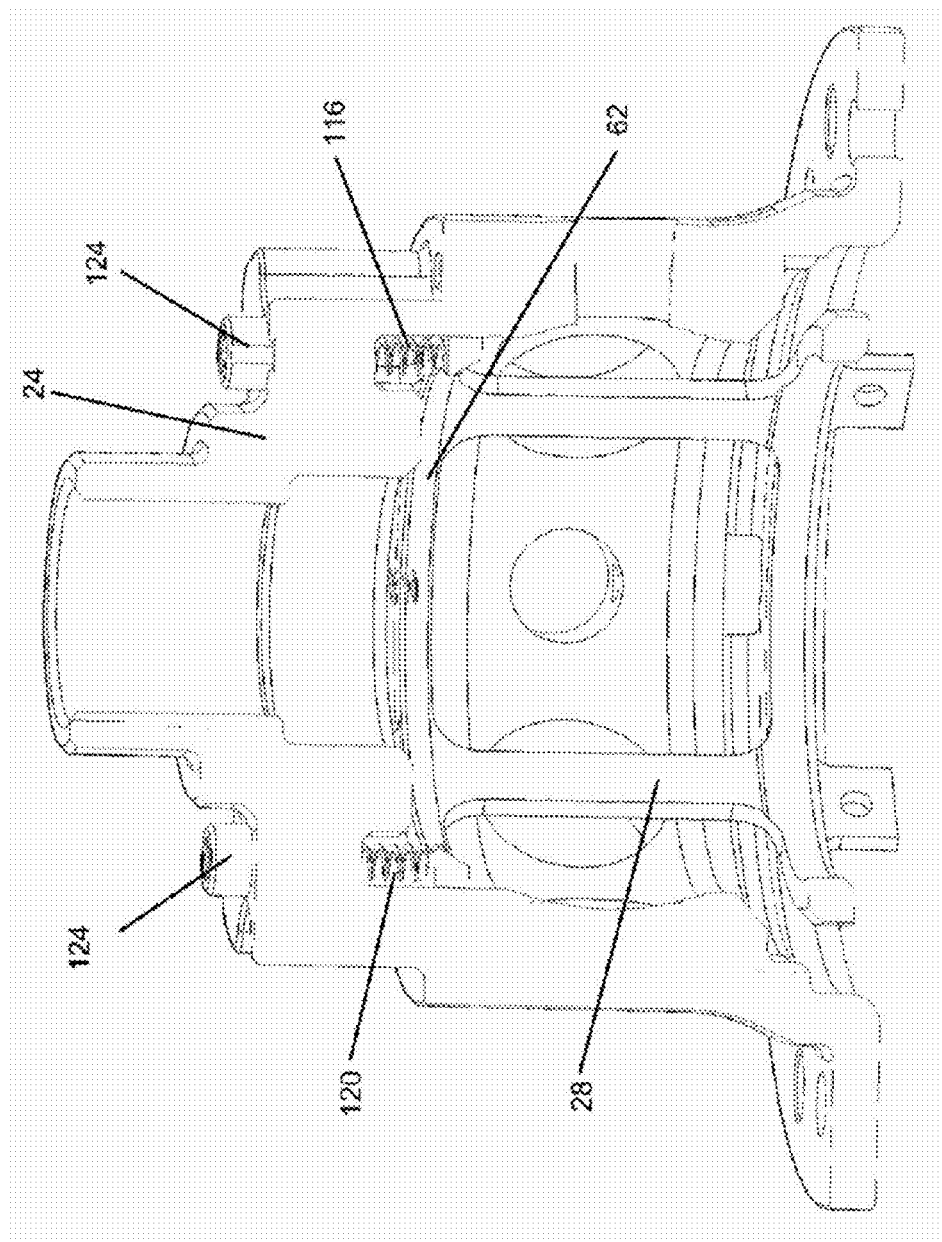
FIG. 17 is a cross-sectional view of the first orientation of the locking differential of FIG. 1.

FIGS. 15-17 are perspective, front and cross-sectional views of the first orientation of the locking differential 20 of FIG. 1. As mentioned herein, the locking differential 20 is a dual orientation locking differential allowing the user to select the default position (i.e., locked by default or unlocked by default). In the first orientation, the locking differential 20 is unlocked and must be actuated to be locked. In the second orientation, the locking differential 20 is locked and must be actuated to be unlocked. The user selects whether the locking differential 20 is in the first orientation or the second orientation.

In the first orientation, the locking differential 20 can include a biasing element disposed between the housing 24 and the cage 28. In the illustrated embodiment, the biasing element includes four springs 116, 118, 120, 122. The four springs 116, 118, 120, 122 can be coupled to the housing 24 by fasteners 124, such as screws or rivets. The four springs 116, 118, 120, 122 can be supported laterally by recesses formed within the housing 24. In the illustrated embodiment, the fasteners 124 are disposed near the bearing surface 88. The fasteners 124 can be disposed between the four openings 80, 82, 84, 86. In some embodiments, the fasteners 124 extend through the housing 24. The fasteners 124 can be coupled to the four springs 116, 118, 120, 122 to maintain the orientation of the four springs 116, 118, 120, 122 relative to the housing 24.

In the illustrated embodiment, the four springs 116, 118, 120, 122 abut the first circumferential support 62 of the cage 28. The first circumferential support 62 can include an engagement surface which abuts the end of the springs 116, 118, 120, 122. The engagement surface can be disposed between the engagement ends 54, 56, 58, 60. In the illustrated embodiment, the springs 116, 118, 120, 122 can abut the first circumferential support 62 between the engagement ends 54, 56, 58, 60 but other configurations are possible.

The springs 116, 118, 120, 122 bias the cage 28 toward the endplate 26. Thus, the springs 116, 118, 120, 122 bias the cog 32 out of engagement with the second gear 36. In the first orientation, the springs 116, 118, 120, 122 bias the locking differential 20 to the unlocked configuration. Referring back to FIG. 2, the cog 32 and the second gear 36 can have a lock assembly that inhibits or prevents unintentional or undesirable rotation of the second gear 36. The cog 32 includes the bearing surface 114 shaped to abut the bearing surface 115 of the second gear 36. Further, the bearing surface 100 of the cog 32 is configured to abut the bearing surface 110 of the endplate 26 to permit longitudinal sliding of the cog 32.

In the first orientation, the default position is that the locking differential 20 is unlocked. The springs 116, 118, 120, 122 bias the cog 32 out of engagement with the second gear 36. The shafts coupled to the first gear 34 and the second gear 36 can rotate independently through the use of the planetary gear train 30. The wheels of the vehicle can rotate at different speeds.

Figure 18:
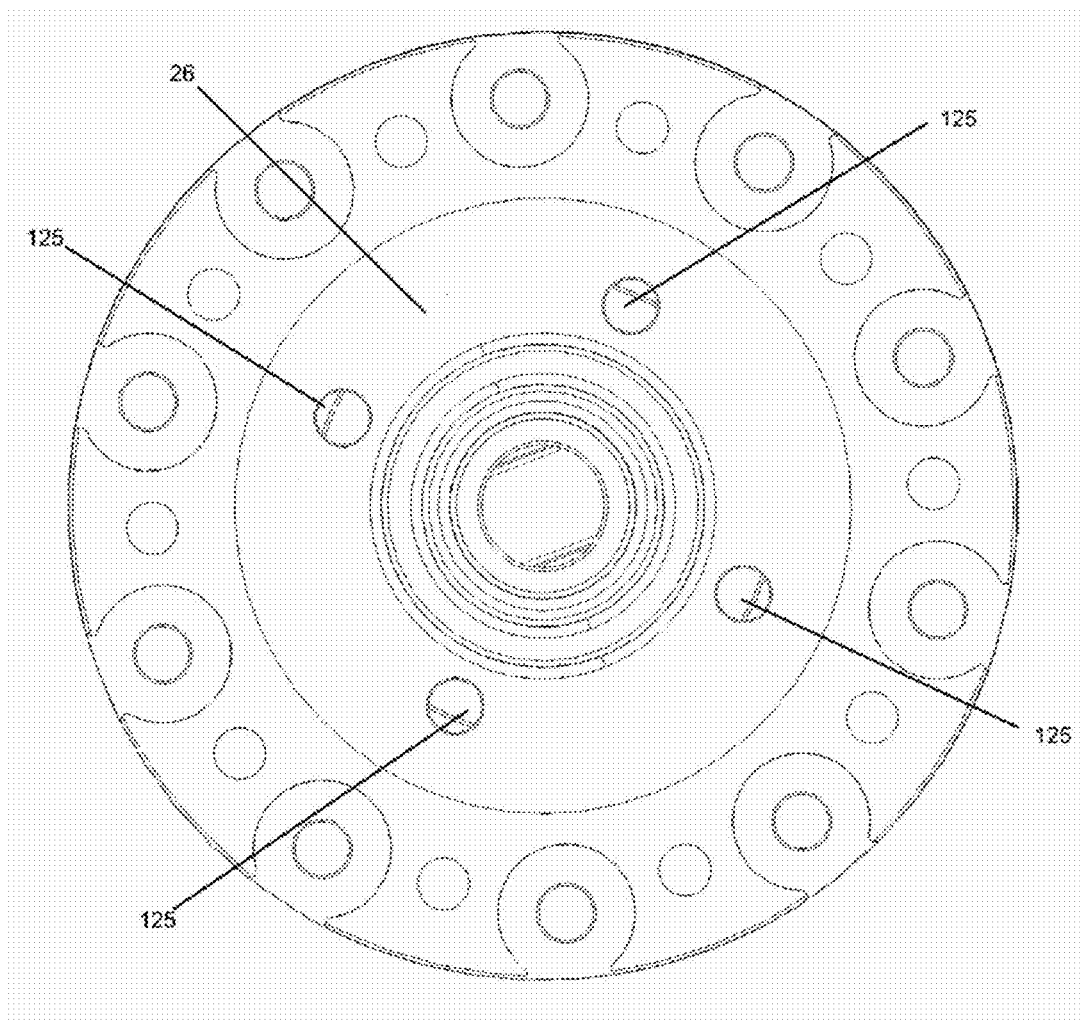
FIG. 18 is a back view of mounting holes for a second orientation of the locking differential of FIG. 1.
Figure 19:
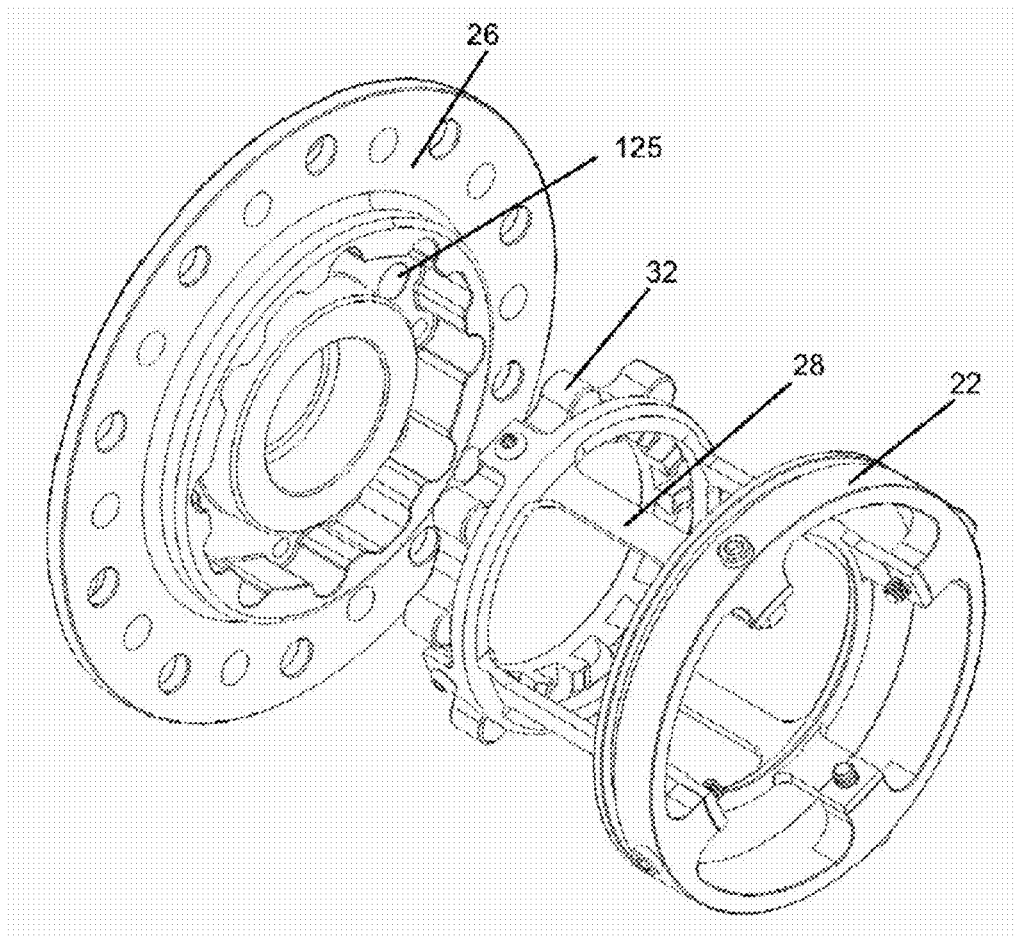
FIG. 19 is a perspective view of the mounting holes for the second orientation of the locking differential of FIG. 1.
Figure 20:
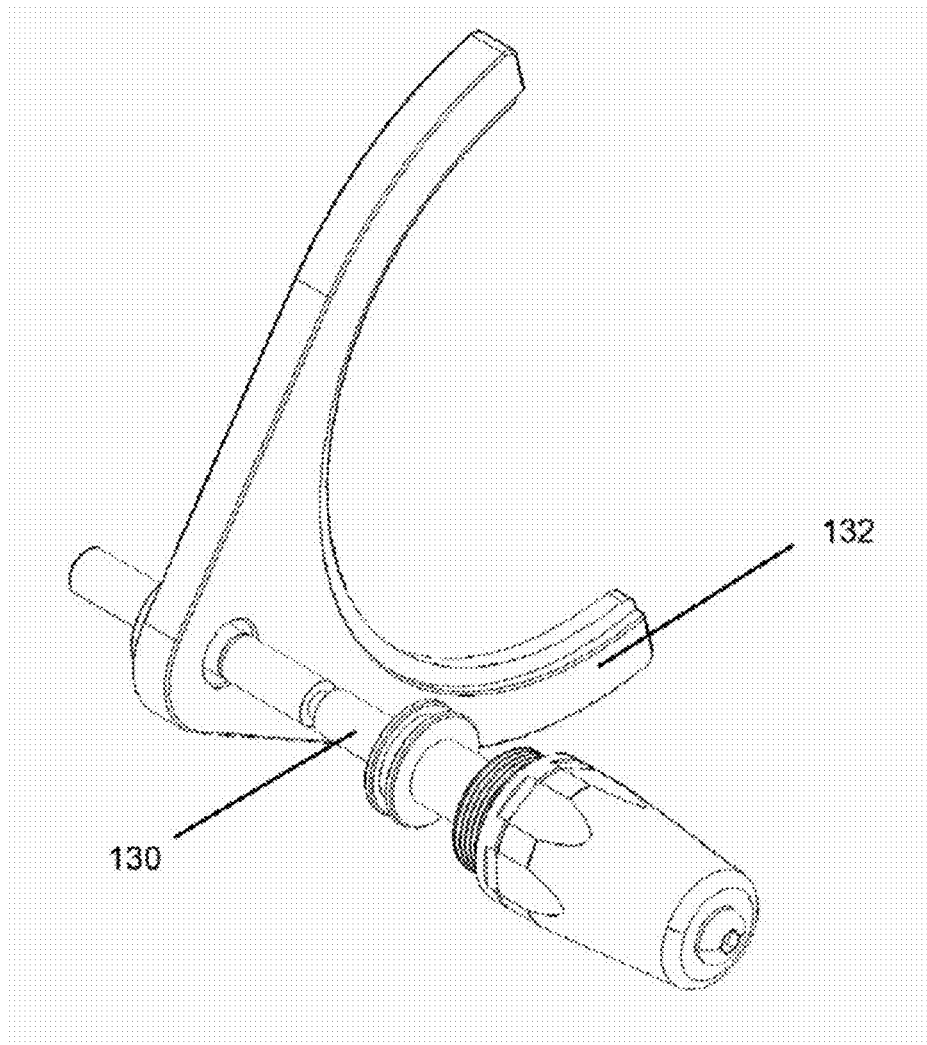
FIG. 20 is a perspective view of a fork and a shaft of FIG. 1.
Figure 21:
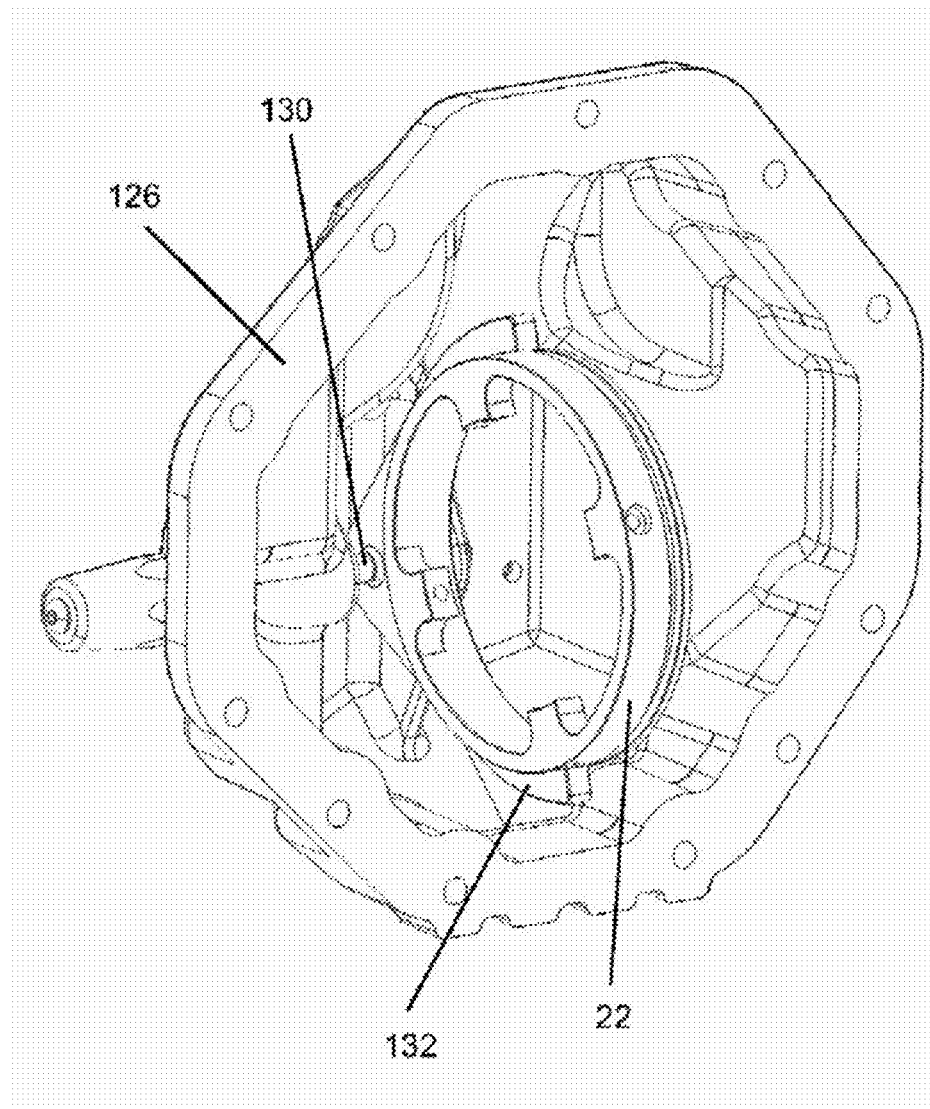
FIG. 21 is a perspective view of the shaft coupled to the front cover, the fork, and the ring of the locking differential of FIG. 1.
Figure 22:
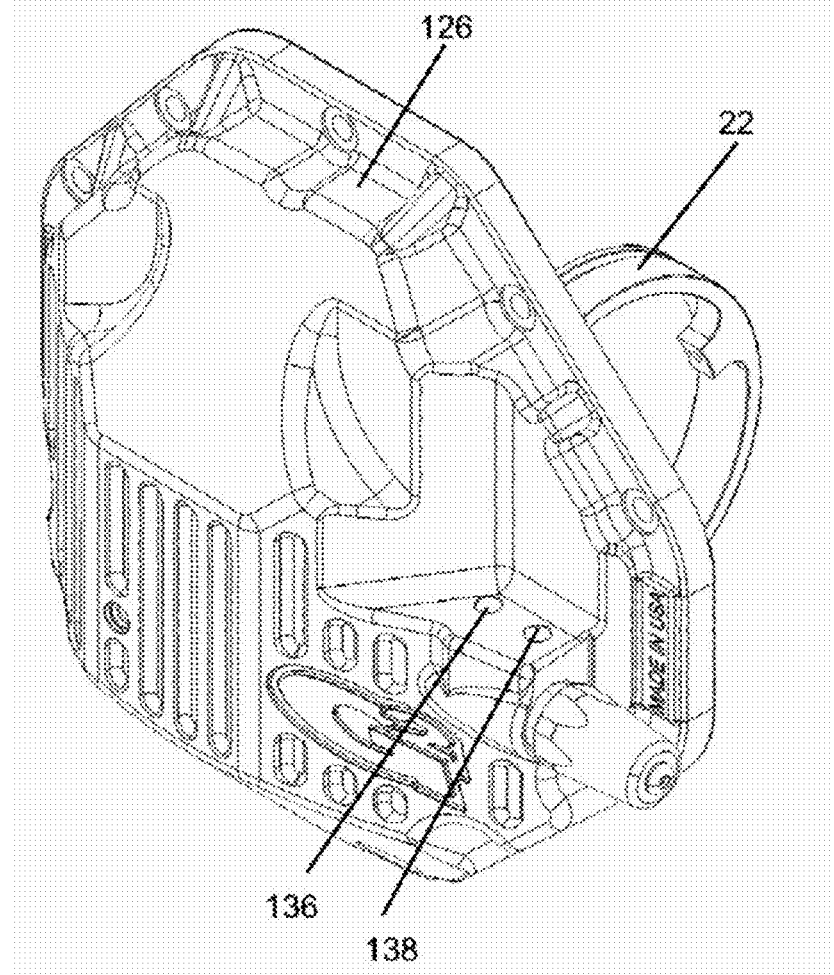
FIG. 22 is a perspective view of the shaft coupled to the front cover, the fork, and the ring of FIG. 1.
Figure 23:
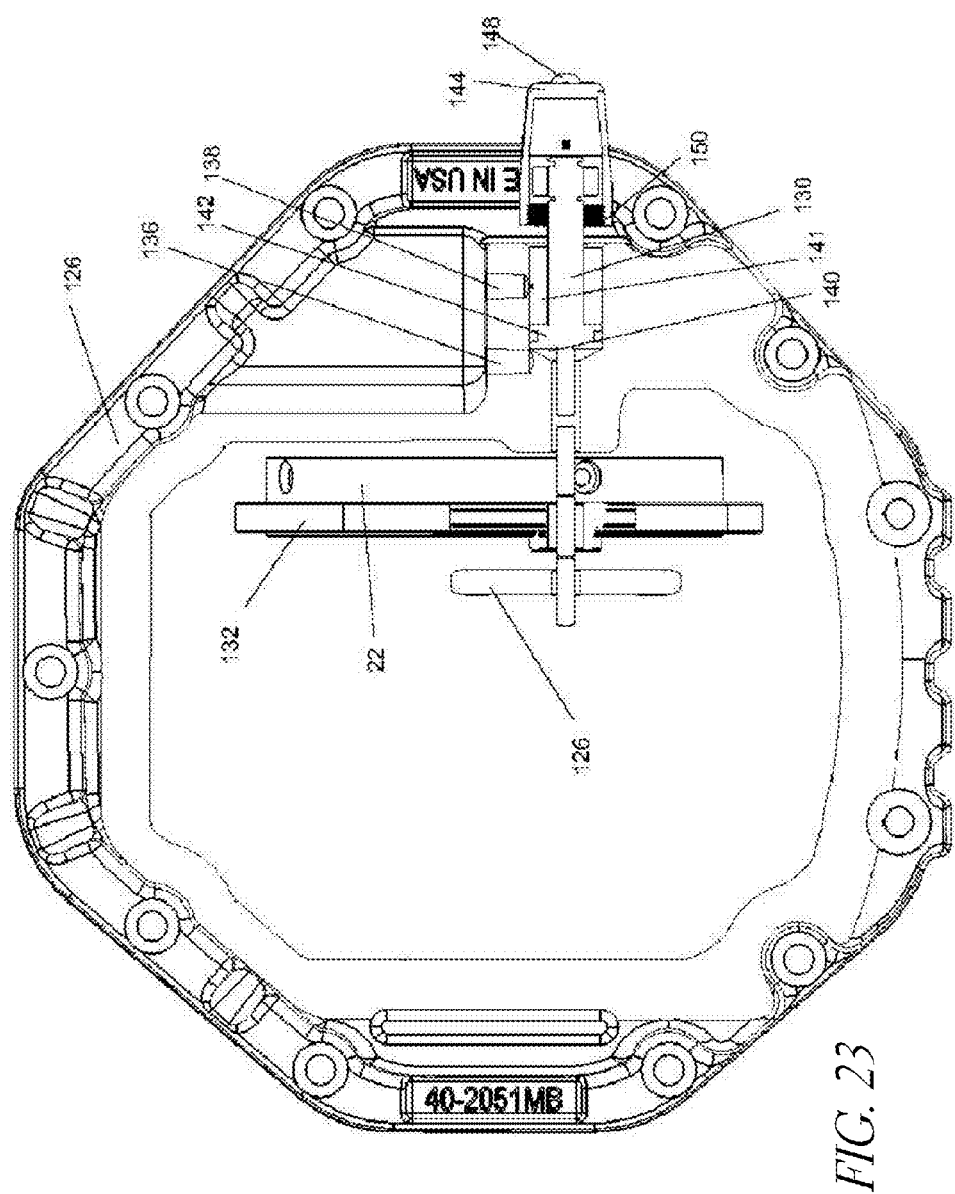
FIG. 23 is a cross-sectional view of the shaft, the front cover, the fork and the ring of FIG. 1.
Figure 24:
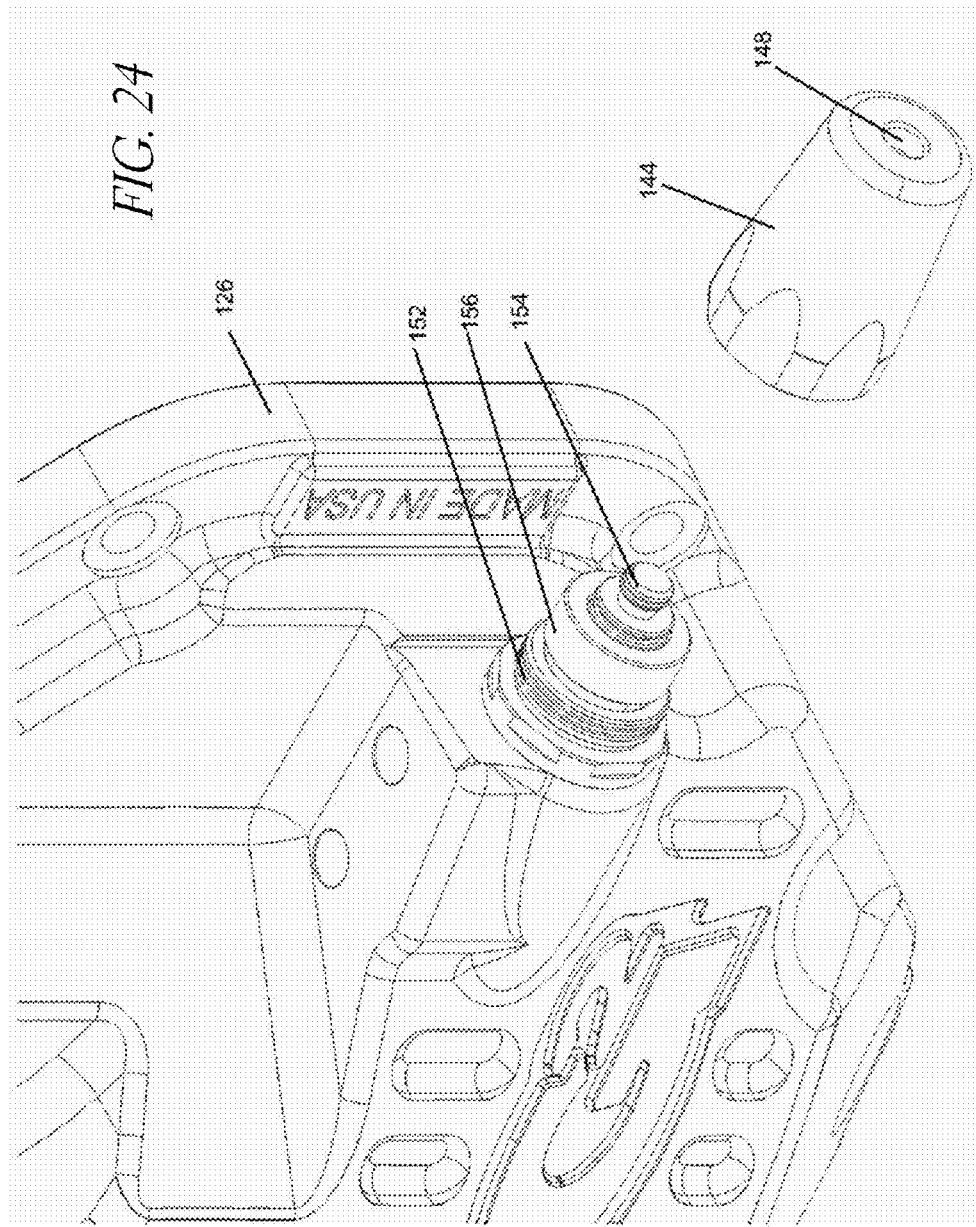
FIG. 24 is a perspective view of the shaft and a handle of FIG. 1.
Figure 25:
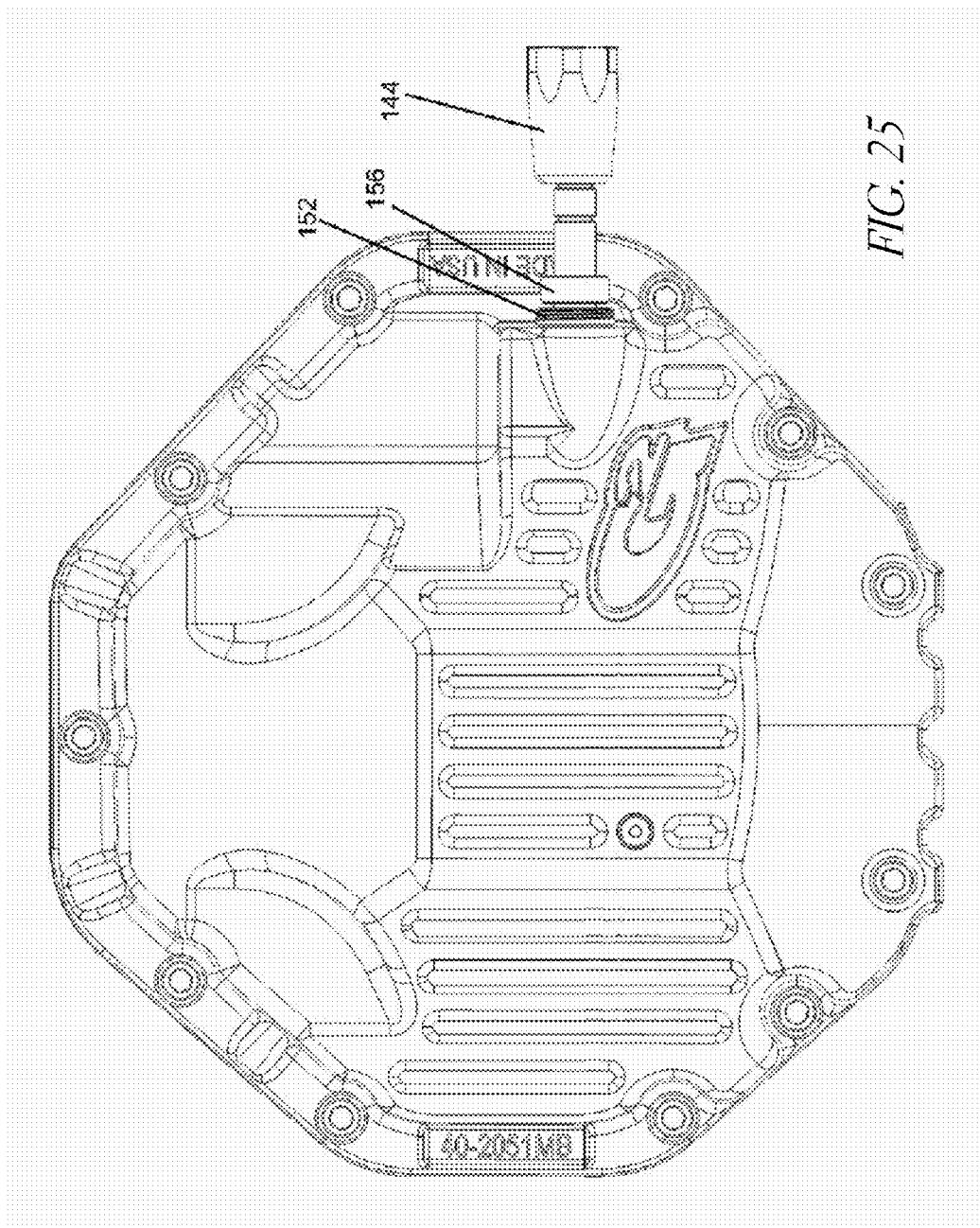
FIG. 25 is a side view of the shaft used as a manual locker of FIG. 1.
Figure 26:
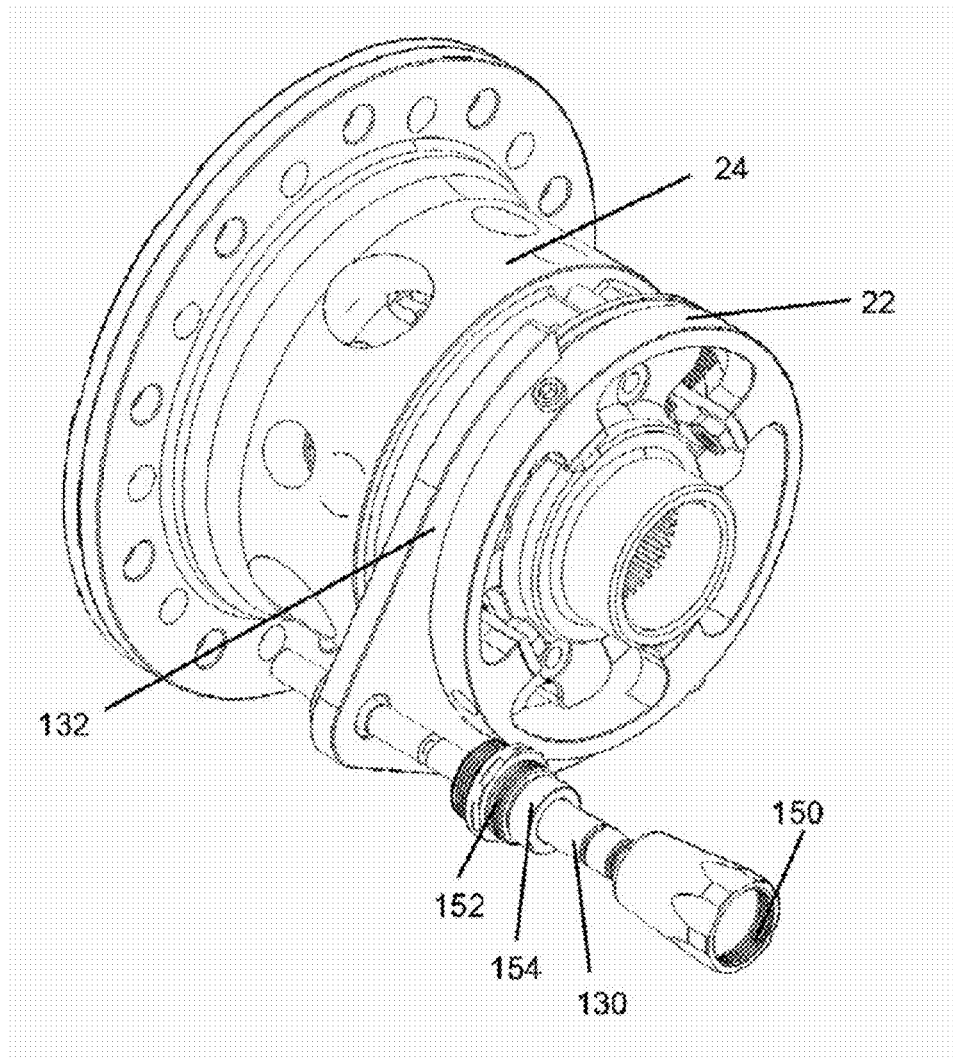
FIG. 26 is a perspective view without the front cover of FIG. 25.

FIGS. 18-19 are perspective views of the mounting holes 125 for the second orientation of the locking differential 20 of FIG. 1. The locking differential 20 can include a biasing element disposed between the endplate 26 and the cog 32. The biasing element can include the four springs 116, 118, 120, 122. The springs 116, 118, 120, 122 shown in FIG. 17 can be removed from between the housing 24 and the first circumferential support 62 of the cage 28 and the springs 116, 118, 120, 122 can be positioned in the second orientation. The four springs 116, 118, 120, 122 can be supported laterally by recesses within the endplate 26.

FIG. 18 shows four mounting holes 125 configured to accept the fasteners 124. The fasteners 124 can be mounted through the endplate 26 and can engage with the four springs 116, 118, 120, 122. The fasteners 124 can be coupled to the four springs 116, 118, 120, 122 to maintain the orientation of the four springs 116, 118, 120, 122 relative to the endplate 26. In the second orientation, the four springs 116, 118, 120, 122 can abut the cog 32. The cog 32 can include an engagement surface which abuts the end of the springs 116, 118, 120, 122. In some embodiments, the four springs 116, 118, 120, 122 can abut the engagement ends 53, 55, 57, 59. In other embodiments, the four springs 116, 118, 120, 122 abut an engagement surface of the cog 32 disposed between the engagement ends 53, 55, 57, 59.

The springs 116, 118, 120, 122 in the second orientation bias the cog 32 away from the endplate 26 and toward the second gear 36. The springs 116, 118, 120, 122 bias the cog 32 into engagement with the second gear 36. In the second orientation, the springs 116, 118, 120, 122 bias the locking differential 20 to the locked configuration. Referring back to FIG. 2, the cog 32 and the second gear 36 can define a locked assembly that inhibits or prevents unintentional or undesirable rotation of the second gear 36. The cog 32 includes the bearing surface 114 shaped to interlock with the bearing surface 115 of the second gear 36. Further, the bearing surface 100 of the cog 32 is configured to interlock with the bearing surface 110 of the endplate 26 to permit longitudinal sliding of the cog 32. In the second orientation, the default position is that the locking differential 20 is locked. The springs 116, 118, 120, 122 bias the cog 32 away from the endplate 26 and into engagement with the second gear 36. The bearing surface 114 engages the bearing surface 115.

In the second orientation, the default position is that the locking differential 20 is locked. The springs 116, 118, 120, 122 (not shown in the second orientation) bias the cog 32 into engagement with the second gear 36. The shafts coupled to the first gear 34 and the second gear 36 cannot rotate independently. The planetary gear train 30 is bypassed. The wheels of the vehicle cannot rotate at different speeds. The shaft coupled to the first gear 34 is thereby coupled to the shaft coupled to the second gear 36. The wheels of the vehicle will rotate together. The planetary gear train 30 is bypassed when the cog 32 is coupled to the second gear 36.

FIGS. 20-26 are perspective, side and cross-sectional views of a shaft 130, a fork 132 and a front cover 126 of FIG. 1. The shaft 130 can be coupled to the fork 132. Longitudinal movement of the shaft 130 will cause longitudinal movement of the fork 132. The shaft 130 can extend into and within a recess or cavity defined within the front cover 126. In the illustrated embodiment, the shaft 130 extends through the front cover 126 and is held in position by at least two points of contact within the front cover 126. The shaft 130 can be coupled to the fork 132 in between the at least two points of the contact with the front cover 126. The fork 132 can include an engagement feature configured to couple to an engagement feature of the ring 22. In the illustrated embodiment, the fork 132 includes a protrusion and the ring 22 includes a groove. Other configurations also are possible.

In the illustrated embodiment, the front cover 126 can include a first inlet 136 and a second inlet 138 near the shaft 130. The first inlet 136 is connected to a first channel 140 that extends along, or at least partially surrounds or fully surrounds, the shaft 130. The second inlet 138 is connected to a second channel 141 that extends along, or at least partially surrounds or fully surrounds, the shaft 130. The shaft 130 includes a spacer 142. The channels 140, 141 are isolated from each other by the spacer 142. The spacer 142 can include a groove for a sealing member (e.g., an O-ring). The shaft 130 can include one or more sealing members at other locations along the length of the shaft 130. The first inlet 136 and first channel 140 are located closer to the fork 132 on a first side of the spacer 142. The second inlet 138 and the second channel 141 are located further away from the fork 132 on a second side of the spacer 142. The first inlet 136 and the second inlet 138 can accept a fluid (e.g., gas, liquid).

The fluid can be used to selectively lock the locking differential 20 when the locking differential 20 is in the first orientation. In the first orientation, the default position is that the locking differential 20 is unlocked. The default position is that the cog 32 is disengaged with the second gear 36. In some arrangements, the springs 116, 118, 120, 122 are placed between the housing 24 and the cage 28 to apply a biasing force on the cage 28. The biasing force pushes the ring 22, the cage 28, and the cog 32 toward the endplate 26. The ring 22, the cage 28, and the cog 32 will slide axially toward the endplate 26 under the influence of the springs 116, 118, 120, 122. The springs 116, 118, 120, 122 bias the cog 32 out of engagement with the second gear 36. The user can position the springs 116, 118, 120, 122 such that the locking differential 20 is in the first orientation.

The first inlet 136 is used in combination with the first orientation. If the first inlet 136 is connected to a fluid source, then the fluid will fill the first channel 140 and apply a force to the spacer 142. The force of the fluid from to the first inlet 136 pushes the fork 132 away from the endplate 26. The fork 132 is coupled to the ring 22, such that the ring 22, the cage 28, and the cog 32 are pushed away from the endplate 26. The fluid applies a force such that the ring 22, the cage 28, and the cog 32 will slide linearly away from endplate 26 toward the second gear 36. The fluid applies a force such that the cog 32 slides into engagement with the second gear 36, thereby locking the locking differential 20. The force applied by the fluid can overcome the biasing force of the biasing element (e.g., springs 116, 118, 120, 122) such that the cog 32 engages the second gear 36. The second inlet 138 can be used as a vent when the first inlet 136 is connected to a fluid source to prevent the generation of an air spring or the like within the region in fluid communication with the second inlet 138.

The user can position the fluid source to connect with the first inlet 136 when the locking differential 20 is in the first orientation such that the locking differential 20 can be locked when desired. The user can reposition the springs 116, 118, 120, 122 and the fluid source if the manufacturer supplies the locking differential 20 in the second orientation. The user can reposition the springs 116, 118, 120, 122 and the fluid source based on user preferences, at any time.

The fluid can be used to selectively unlock the locking differential 20 when the locking differential 20 is in the second orientation. In the second orientation, the default position is that the locking differential 20 is locked. The default position is that the cog 32 is engaged with the second gear 36. In some arrangements, the springs 116, 118, 120, 122 are placed between the endplate 26 and the cog 32 to apply a biasing force on the cog 32. The biasing force pushes the ring 22, the cage 28, and the cog 32 away from the endplate 26 and toward the second gear 36. The ring 22, the cage 28, and the cog 32 will slide linearly away from the endplate 26 under the influence of the springs 116, 118, 120, 122. The springs 116, 118, 120, 122 bias the cog 32 such that the cog 32 engages with the second gear 36. The user can position the springs 116, 118, 120, 122 such that the locking differential 20 is in the second orientation.

The second inlet 138 is used in combination with the second orientation. If the second inlet 138 is connected to a fluid source, then the fluid will fill the second channel 141 and apply a force to the spacer 142. This force will move the fork 132 toward the endplate 26. The force of the fluid connected to the second inlet 138 pushes the fork 132 toward the endplate 26. The fork 132 is coupled to the ring 22, such that the ring 22, the cage 28, and the cog 32 are pushed toward the endplate 26. The fluid applies a force such that the ring 22, the cage 28, and the cog 32 will slide linearly toward the endplate 26 and disengage the second gear 36. The force applied to the spacer 142 can overcome the biasing force of the biasing elements (e.g., springs 116, 118, 120, 122) placed between the endplate 26 and the cog 32. The fluid applies a force such that the cog 32 slides away from the second gear 36, thereby unlocking the locking differential 20. The first inlet 136 can be used as a vent when the second inlet 138 is connected to a fluid source to prevent creating an air spring within the region fluidly connected to the first inlet 136.

The user can position the fluid source to connect to the second inlet 138 when the locking differential 20 is in the second orientation such that the locking differential 20 can be unlocked. The user can reposition the springs 116, 118, 120, 122 and the fluid source if the manufacturer supplies the locking differential 20 in the first orientation. The user can reposition the springs 116, 118, 120, 122 and the fluid source based on user preferences, at any time.

The shaft 130 can include features that allow the user to manually lock or unlock the locking differential 20. The shaft 130 can include handle 144. The handle 144 can include a first threaded lumen 146. In some arrangements, a fastener 148 can be coupled with the first threaded lumen 146. The handle 144 can include a second threaded lumen 150. The second threaded lumen 150 can be coupled to a threaded post 152. The threaded post 152 can be coupled with the first cover 126. The user can remove the fastener 148, thereby exposing the first threaded lumen 146. The user can rotate the handle 144 to disengage the second threaded lumen 150 from the threaded post 152. The user can remove the handle 144 from the shaft 130.

The shaft 130 can include a threaded end 154. The shaft can include a stop 156 near the threaded end 154. The user can flip the handle 144. The user can engage the first threaded lumen 146 with the threaded end 154 of the shaft 130. With the handle 144 flipped and engaged to the shaft 130, the user can slide the shaft 130 linearly. Moving the shaft 130 outward, away from the threaded post 152 will slide the fork 132 away from the endplate 26. The ring 22, the cage 28, and the cog 32 are coupled to the fork 132 and will slide away from the endplate 26 and toward the second gear 36. The user can slide the stop 156 adjacent to the threaded post 152 thereby preventing the shaft 130 from sliding linearly. The stop in this position 156 will prevent the locking differential 20 from unlocking.

The movement of the shaft 130 away from the threaded post 152 will cause the locking differential 20 to lock. This movement provides a manual lock if the locking differential 20 is in the first orientation. In the first orientation, the default position is that the locking differential 20 is unlocked. If the user must lock the locking differential 20, then the user can use the shaft 130 to manually lock the locking differential 20.

Moving the shaft 130 inward, toward the threaded post 152 will slide the fork 132 toward the endplate 26. The ring 22, the cage 28, and the cog 32 are coupled to the fork 132 and will slide toward the endplate 26. The user can slide the stop 156 adjacent to the threaded post 152 thereby preventing the shaft 130 from sliding linearly. The stop 156 in this position will prevent the locking differential 20 from locking.

The movement of the shaft 130 toward the threaded post 152 will cause the locking differential 20 to unlock. This movement provides a manual unlock if the locking differential 20 is in the second orientation. In the second orientation, the default position is that the locking differential 20 is locked. If the user must unlock the locking differential 20, then the user can use the shaft 130 to manually unlock the locking differential 20.

Figure 27:
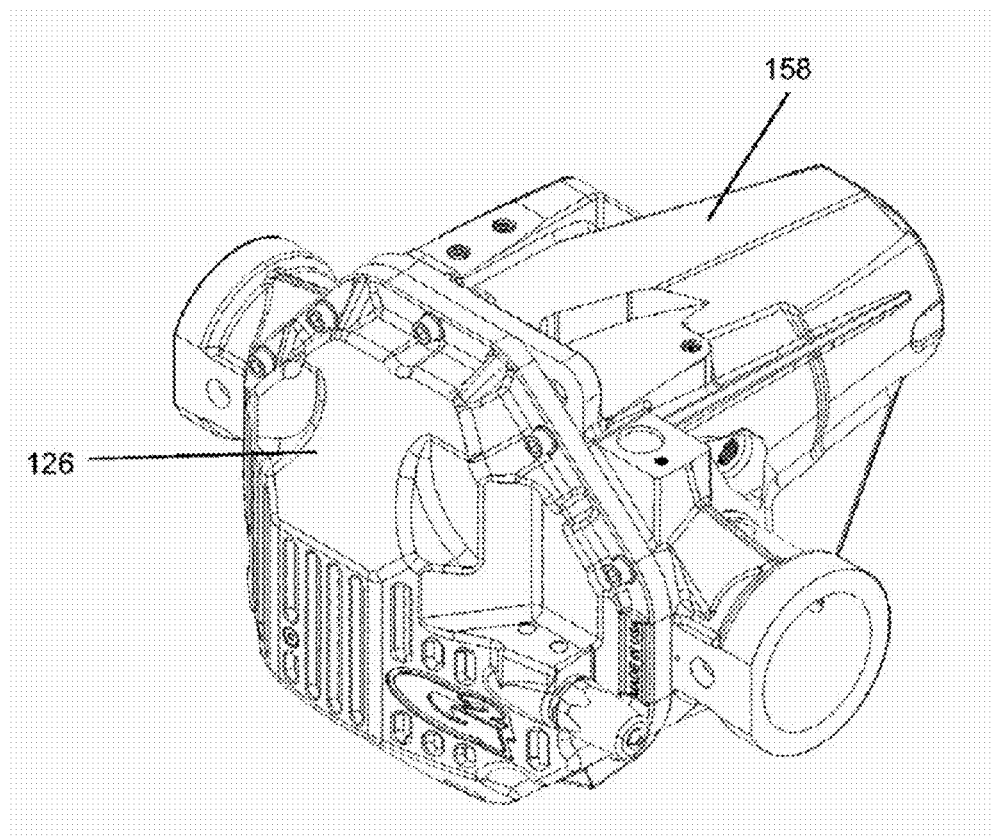
FIG. 27 is a perspective view of the front cover and a back cover of the locking differential of FIG. 1.

FIG. 27 is a perspective view of the front cover 126 and a back cover 158. The front cover 126 couples with the back cover 158 with fasteners (e.g., screws, rivets, bolts). The front cover 126 and the back cover 158 enclose the ring 22, the housing 24, and the endplate 26, as well as other components mentioned herein. The front cover 126 can provide the inlets 136, 138 used to lock or unlock the locking differential 20. The back cover 158 maintains the orientation of the front cover 126 relative to the drive shaft and the shafts connected to the wheels of the vehicle.

While not illustrated herein, the fluid used to lock and/or unlock the locking differential can be supplied in any suitable manner. In some configurations, the fluid can be supplied by a pump (e.g., when the fluid is a liquid) or by a compressor (e.g., when the fluid is a gas). In some configurations, fluid is not used and a solenoid or the like can be used. In some configurations, the pump and/or compressor can be actuated from within the cabin of the vehicle to which the system is attached. In some configurations, an electrical connection between a switch and the pump and/or compressor can be used to actuator the pump and/or compressor. In some such configurations, the electrical connection can include a switch that is disposed within the cabin of the vehicle such that the differential can be locked or unlocked without having to leave the cabin of the vehicle. In some configurations, the system used to lock and unlock the differential can include one or more sensors that indicate when the differential is locked, is unlocked or both and the one or more sensors can be used to provide an indication to the user of the status of the differential.

Figure 28:
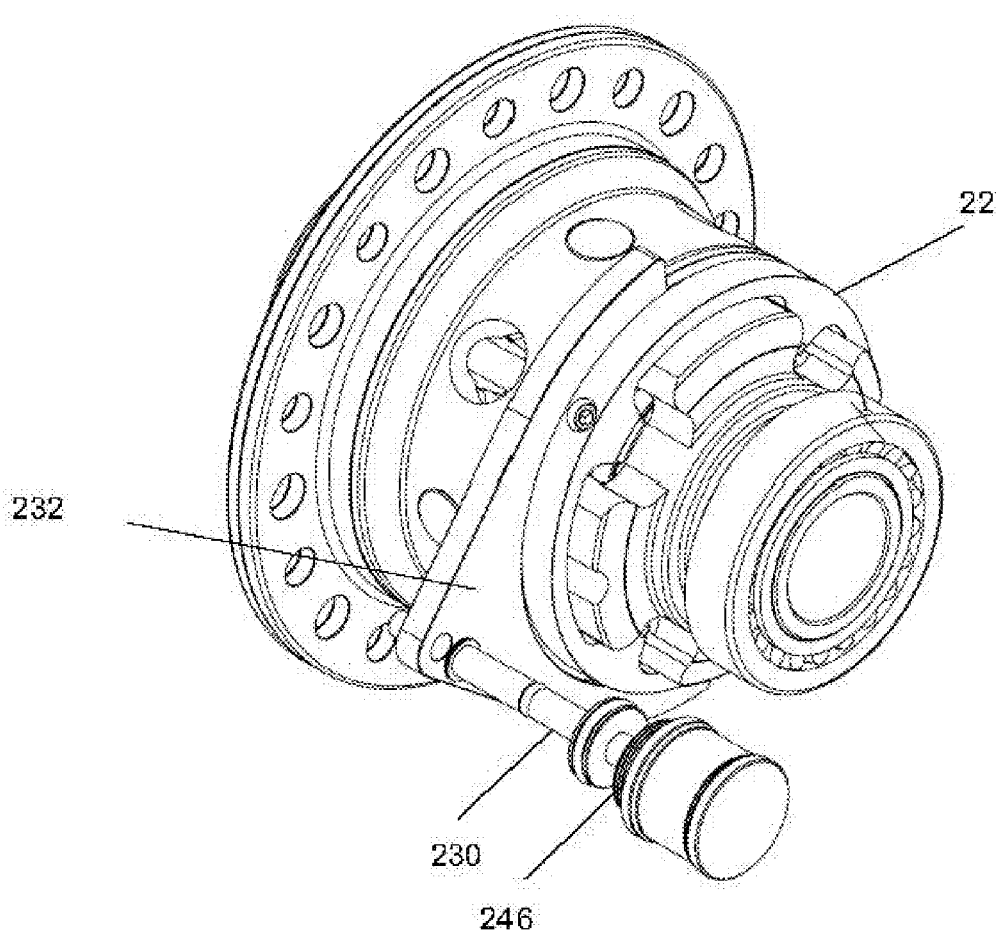
FIG. 28 is a perspective view of an alternative embodiment of a shaft without a front cover.
Figure 29:
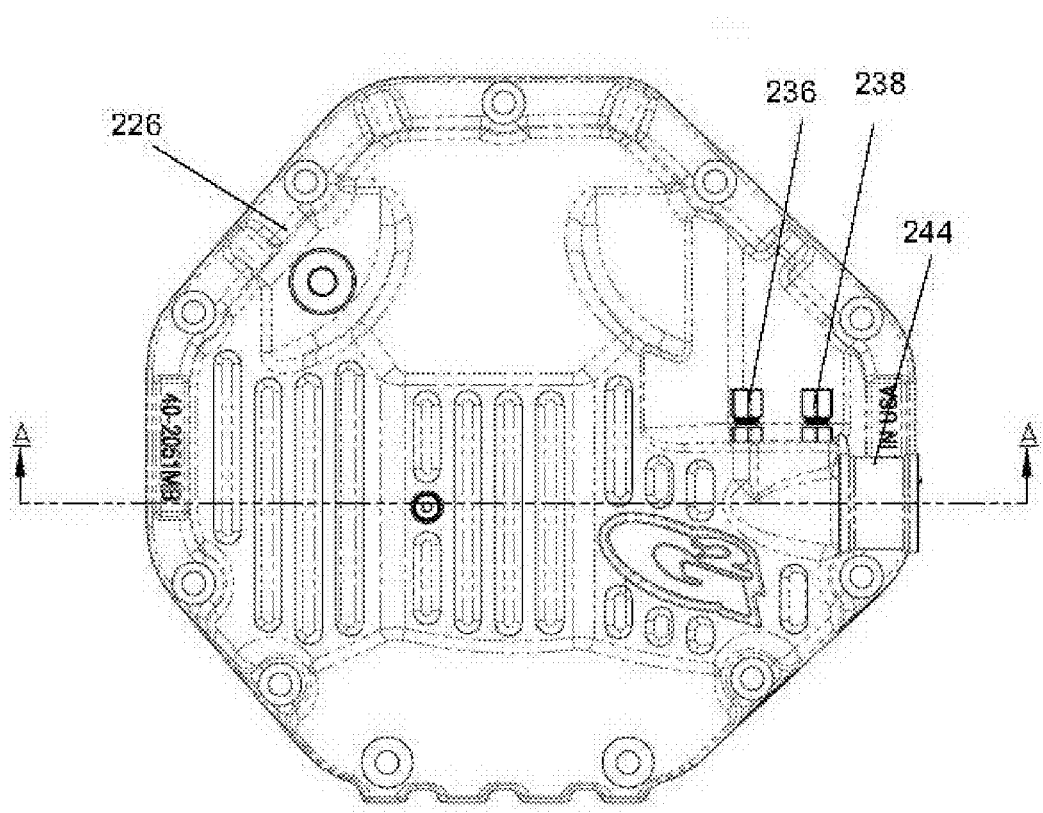
FIG. 29 is a side view of the shaft of FIG. 28 coupled to a front cover.
Figure 30:
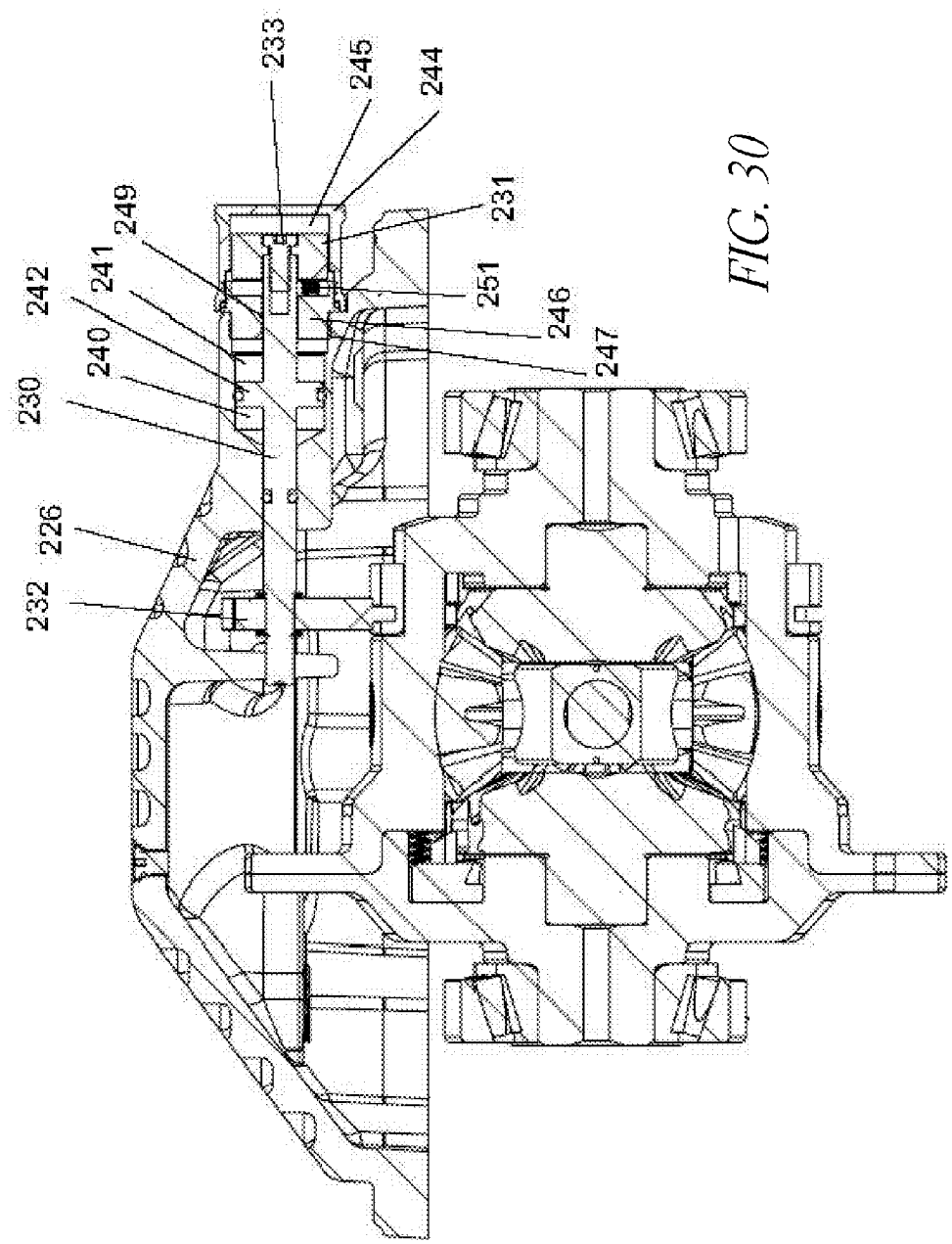
FIG. 30 is a cross-sectional view of the shaft, the front cover, and a fork taken along the line A-A of FIG. 29.
Figure 31:
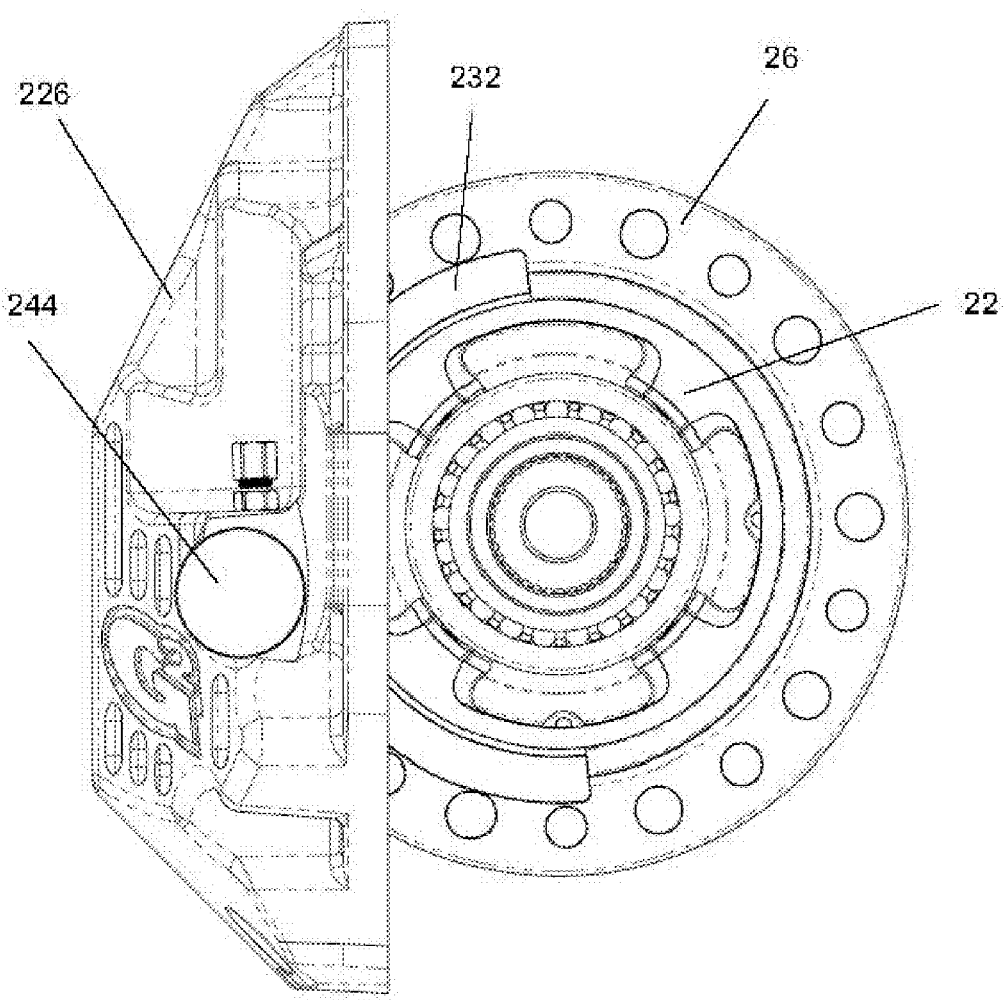
FIG. 31 is a front view of the shaft of FIG. 28 coupled to the front cover.
Figure 32:
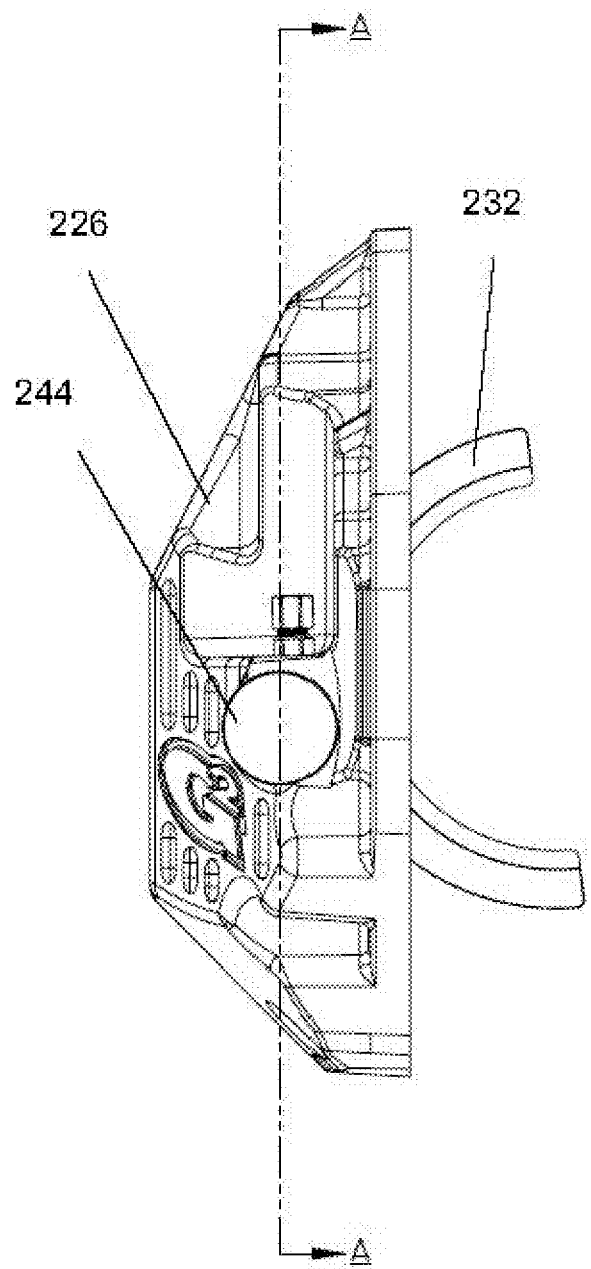
FIG. 32 is a front view of the assembly of FIG. 31 with components of the locking differential removed.
Figure 33:
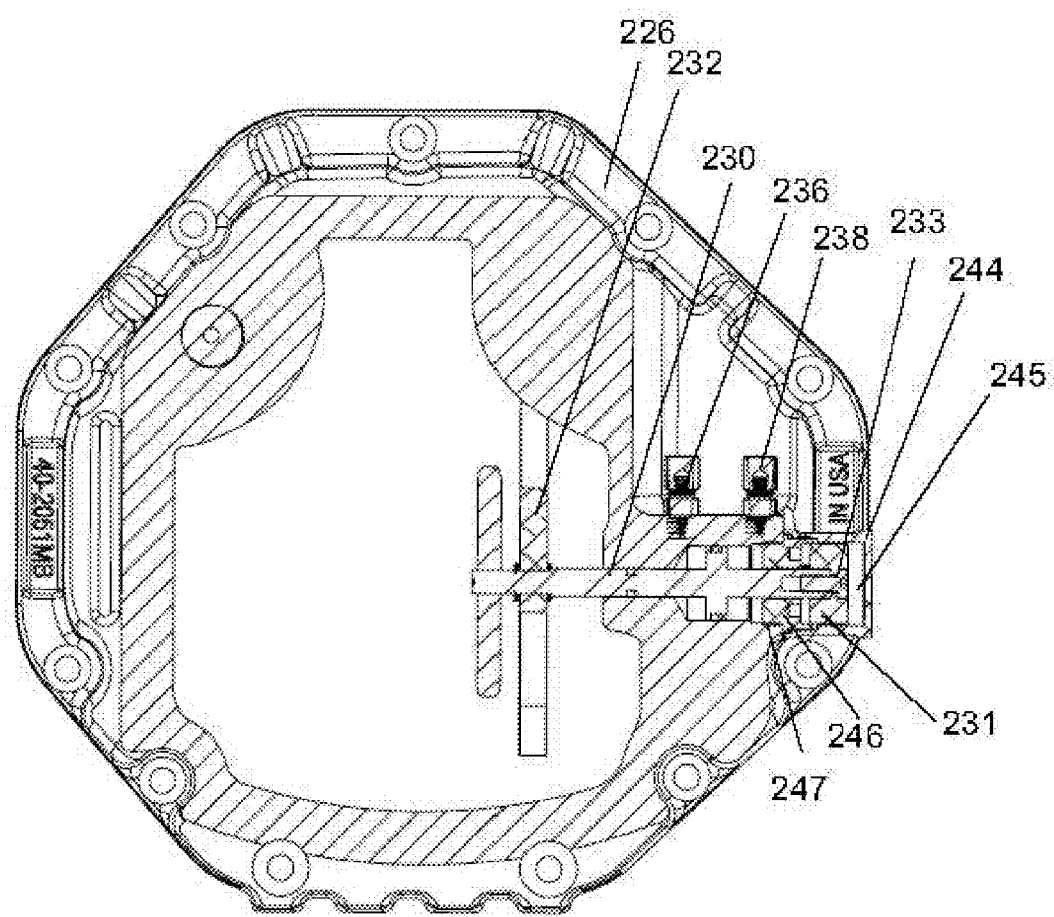
FIG. 33 is a cross-sectional view of the shaft, the front cover and the fork taken along the line A-A of FIG. 32.
Figures 34A, 34B:
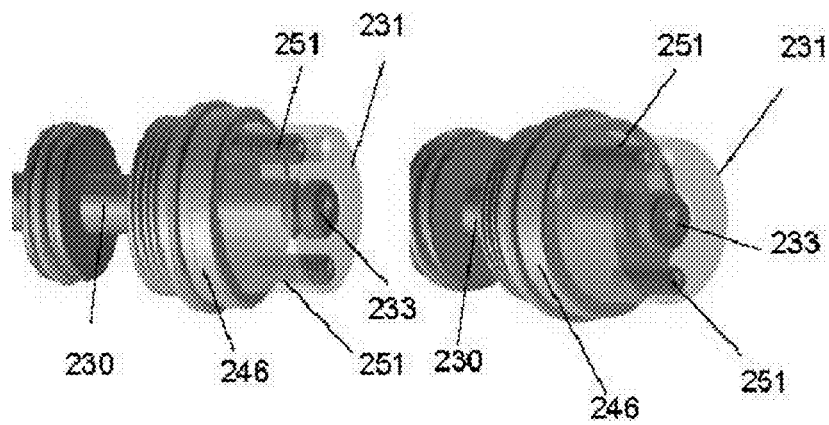
FIGS. 34A-34D are various views of the shaft, one or more screws and a fastener as shown in FIG. 28.
Figures 34C, 34D:
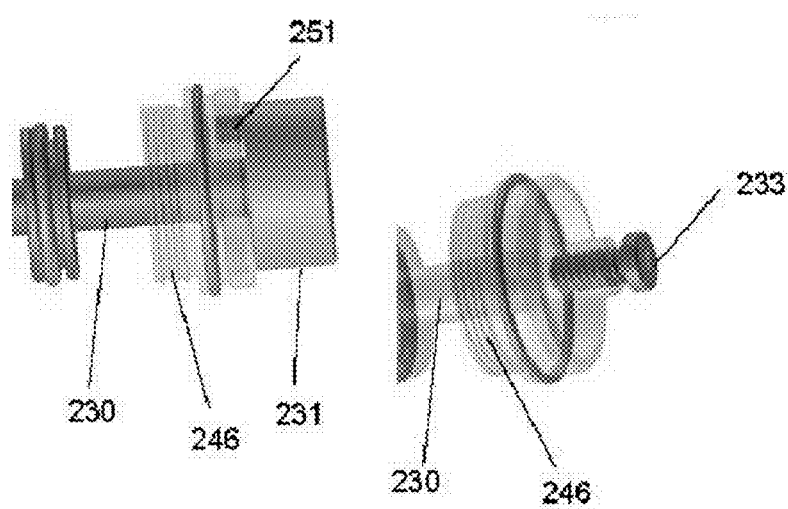

FIGS. 28-33 are perspective, side and cross-sectional views of a shaft 230, a fork 232 and a front cover 226. The components can have similar features to the components described above with respect to FIGS. 1-27. FIG. 28 is a perspective view of the shaft 230. FIG. 29 is a side view of a handle 244 of the shaft 230 with a front cover 226. FIG. 30 is a cross-sectional view of the shaft 230, the front cover 226, and a fork 232 taken along the line A-A of FIG. 29. FIG. 31 is a front view of the shaft 230 coupled to the front cover 226. FIG. 32 is a front view with components of the locking differential 20 removed. FIG. 33 is a cross-sectional view of the shaft 230, the front cover 226, and the fork 232 taken along the line A-A of FIG. 32.

FIGS. 34A-34D are various views of a jack screw assembly of FIG. 28. The shaft 230 utilizes the jack screw assembly to allow the locking differential 20 to be manually locked or unlocked. Some users may be unable to pull or push the shaft 130 described herein to manually lock or unlock the locking differential 20. The jack screw assembly allows the user to more easily translate the shaft 230.

Referring to FIG. 28, the shaft 230 can be coupled to the fork 232. Longitudinal movement of the shaft 230 will cause longitudinal movement of the fork 232. The fork 232 can include an engagement feature configured to couple to an engagement feature of the ring 22, as described herein. In the illustrated embodiment, the fork 232 includes a protrusion and the ring 22 includes a groove, as shown in FIG. 28. Other configurations also are possible.

Referring to FIGS. 29 and 30, the shaft 230 can extend into and within a recess or cavity defined within the front cover 226. In the illustrated embodiment, the shaft 230 extends through the front cover 226 and is held in position by at least two points of contact within the front cover 226. The shaft 230 can be coupled to the fork 232 in between the at least two points of contact with the front cover 226, as shown in FIG. 30.

The front cover 226 can include a first inlet 236 and a second inlet 238 near the shaft 230. The first inlet 236 and the second inlet 238 can accept a fluid (e.g., gas, liquid). The first inlet 236 is connected to a first channel 240 that extends along, or at least partially surrounds or fully surrounds, the shaft 230. The second inlet 238 is connected to a second channel 241 that extends along, or at least partially surrounds or fully surrounds, the shaft 230. The shaft 230 includes a spacer 242 that separates the first channel 240 and the second channel 241. The spacer 242 can include a groove for a sealing member (e.g., an O-ring). The shaft 230 can include one or more sealing members at other locations along the length of the shaft 230. The first inlet 236 and the first channel 240 are located closer to the fork 232 on a first side of the spacer 242. The second inlet 238 and the second channel 241 are located further away from the fork 232 on a second side of the spacer 242.

The fluid can be used to selectively lock the locking differential 20 when the locking differential 20 is in the first orientation. In the first orientation, the default position is that the locking differential 20 is unlocked. As described herein with respect to the first orientation, the default position is that the cog 32 is disengaged with the second gear 36. In some arrangements, the springs 116, 118, 120, 122 are placed between the housing 24 and the cage 28 to apply a biasing force on the cage 28. The biasing force pushes the ring 22, the cage 28, and the cog 32 toward the endplate 26. The ring 22, the cage 28, and the cog 32 will slide axially toward the endplate 26 under the influence of the springs 116, 118, 120, 122. The springs 116, 118, 120, 122 bias the cog 32 out of engagement with the second gear 36. The user can position the springs 116, 118, 120, 122 such that the locking differential 20 is biased toward the first orientation.

The first inlet 236 is used in combination with the first orientation. If the first inlet 236 is connected to a fluid source, then the fluid will fill the first channel 240 and apply a force to the spacer 242. The force of the fluid from to the first inlet 236 pushes the fork 232 away from the endplate 26. The fork 232 is coupled to the ring 22, such that the ring 22, the cage 28, and the cog 32 are pushed away from the endplate 26. The fluid applies a force such that the ring 22, the cage 28, and the cog 32 will slide linearly away from endplate 26 toward the second gear 36. The fluid applies a force such that the cog 32 slides into engagement with the second gear 36, thereby locking the locking differential 20. The force applied by the fluid can overcome the biasing force of the biasing element (e.g., springs 116, 118, 120, 122) such that the cog 32 engages the second gear 36. The second inlet 238 can be used as a vent when the first inlet 236 is connected to a fluid source to prevent the generation of an air spring or the like within the region in fluid communication with the second inlet 238.

The user can position the fluid source to connect with the first inlet 236 when the locking differential 20 is in the first orientation such that the locking differential 20 can be locked when desired. The user can reposition the springs 116, 118, 120, 122 and the fluid source if the manufacturer supplies the locking differential 20 in the second orientation. The user can reposition the springs 116, 118, 120, 122 and the fluid source based on user preferences, at any time.

The fluid can be used to selectively unlock the locking differential 20 when the locking differential 20 is in the second orientation. As described herein with respect to the second orientation, the default position is that the locking differential 20 is locked. The default position is that the cog 32 is engaged with the second gear 36. In some arrangements, the springs 116, 118, 120, 122 are placed between the endplate 26 and the cog 32 to apply a biasing force on the cog 32. The biasing force pushes the ring 22, the cage 28, and the cog 32 away from the endplate 26 and toward the second gear 36. The ring 22, the cage 28, and the cog 32 will slide linearly away from the endplate 26 under the influence of the springs 116, 118, 120, 122. The springs 116, 118, 120, 122 bias the cog 32 such that the cog 32 engages with the second gear 36. The user can position the springs 116, 118, 120, 122 such that the locking differential 20 is in the second orientation.

The second inlet 238 is used in combination with the second orientation. If the second inlet 238 is connected to a fluid source, then the fluid will fill the second channel 241 and apply a force to the spacer 242. This force will move the fork 232 toward the endplate 26. The force of the fluid connected to the second inlet 238 pushes the fork 232 toward the endplate 26. The fork 232 is coupled to the ring 22, such that the ring 22, the cage 28, and the cog 32 are pushed toward the endplate 26. The fluid applies a force such that the ring 22, the cage 28, and the cog 32 will slide linearly toward the endplate 26 and disengage the second gear 36. The force applied to the spacer 242 can overcome the biasing force of the biasing elements (e.g., springs 116, 118, 120, 122) placed between the endplate 26 and the cog 32. The fluid applies a force such that the cog 32 slides away from the second gear 36, thereby unlocking the locking differential 20. The first inlet 236 can be used as a vent when the second inlet 238 is connected to a fluid source to prevent creating an air spring within the region fluidly connected to the first inlet 236.

The user can position the fluid source to connect to the second inlet 238 when the locking differential 20 is in the second orientation such that the locking differential 20 can be unlocked. The user can reposition the springs 116, 118, 120, 122 and the fluid source if the manufacturer supplies the locking differential 20 in the first orientation. The user can reposition the springs 116, 118, 120, 122 and the fluid source based on user preferences, at any time.

As shown in FIGS. 34A-34D, the system can include features that allow the user to manually lock or unlock the locking differential 20. The system can include a block 231. The block 231 can be coupled to the proximal end of the shaft 230. In the illustrated embodiment, a fastener 233 couples the block 231 with the proximal end of the shaft 230. Other configurations are contemplated.

The system can include a handle 244 or cover as shown in FIGS. 30 and 33. The handle 244 or cover can define a cavity 245. The cavity 245 can be sized to allow the block 231 to linearly translate within the handle 244 or cover when the first channel 240 or the second channel 241 is filled. The handle 244 can be coupled to an anchoring portion 246. The anchoring portion 246 can include threads to engage a corresponding threaded portion 247 of the front cover 226. The anchoring portion 246 can include a through lumen 249. The shaft 230 is able to linearly translate within the through lumen 249 of the anchoring portion 246 when the first channel 240 or the second channel 241 is filled.

One or more screws 251 can be extend through the block 231. The block 231 can be threaded to engage the one or more screws 251. The one or more screws 251 can abut the anchoring portion 246. The one or more screw 251 can move the block 231 away from the anchoring portion 246 as described herein. In the illustrated embodiment, the system can include two screws 251. The two screws 251 can be diametrically opposed. The two screws 251 can be radially spaced. Other configurations are contemplated (e.g, one screw, three screws, four screws, equally spaced, unequally spaced, etc.). In some methods of use, the one or more screws 251 are rotated simultaneously. In other methods of use, the one or more screws 251 are rotated independently.

The user may wish to manually lock or unlock the locking differential 20. For instance, the supply of fluid could be depleted. For instance, the seal of the spacer 242 could break. Other situations may necessitate manually locking or unlocking the locking differential 20. In some methods of use, the user removes the handle 244 or cover. The handle 244 or cover can be releasably coupled to the anchoring portion 246. In the illustrated embodiment, the handle 244 or cover is coupled to the anchoring portion 246 with an O-ring.

In some methods of use, the one or more screws 251 can be tightened to move the block 231 away from the anchoring portion 246. In some embodiments, the one or more screws 251 can be rotated without removing the handle 244 or cover. The handle 244 or cover can include one or more lumens to allow the one or more screw 251 to be rotated without removing the handle or cover. In the illustrated embodiment, the handle 244 or cover is removed to rotate the one or more screws 251.

In some methods of use, the block 231 does not rotate as each screw 251 rotates. In some methods of use, the block 231 translates as each screw 251 rotates. As described herein, the block 231 is coupled to the shaft 230. In some methods of use, the shaft 230 does not rotate as each screw 251 rotates. In some methods of use, the shaft 230 translates as each screw 251 rotates. The user can rotate the one or more screws 251 to linearly translate the shaft 230 away from the endplate 26. This action will lock the locking differential 20.

The user can slide the shaft 230 outward by rotating the one or more screws 251. Moving the shaft 230 outward will slide the fork 232 away from the endplate 26. The ring 22, the cage 28, and the cog 32 are coupled to the fork 232 and will slide away from the endplate 26 and toward the second gear 36. The movement of the shaft 230 outward will cause the locking differential 20 to lock. This movement provides a manual lock if the locking differential 20 is in the first orientation. In the first orientation, the default position is that the locking differential 20 is unlocked. If the user must lock the locking differential 20, then the user can use the one or more screws 251 to manually lock the locking differential 20.

In some methods of use, the fastener 233 can be rotated to move the shaft 230 away from the block 231. In some embodiments, the fastener 233 can be rotated without removing the handle 244 or cover. The handle 244 or cover can include one or more lumens to allow the fastener 233 to be rotated without removing the handle or cover. In the illustrated embodiment, the handle 244 or cover is removed to rotate the fastener 233.

In some methods of use, the block 231 does not rotate as the fastener 233 rotates. In some methods of use, the block 231 does not translate as the fastener 233 rotates. The block 231 is coupled to the shaft 230. In some methods of use, the shaft 230 does not rotate as the fastener 233 rotates. In some methods of use, the shaft 230 translates as the fastener 233 rotates. The user can rotate the fastener 233 in one direction to linearly translate the shaft 230 toward the endplate 26. This action will unlock the locking differential 20.

The user can slide the shaft 230 inward by rotating the fastener 233. Moving the shaft 230 inward will slide the fork 232 toward the endplate 26. The ring 22, the cage 28, and the cog 32 are coupled to the fork 232 and will slide toward the endplate 26. The movement of the shaft 230 inward will cause the locking differential 20 to unlock. This movement provides a manual unlock if the locking differential 20 is in the second orientation. In the second orientation, the default position is that the locking differential 20 is locked. If the user must unlock the locking differential 20, then the user can use the shaft 230 to manually unlock the locking differential 20.

The threads of the one or more screws 251 prevent the block 231 from sliding relative to the anchoring portion 246. The threads of the one or more screws 251 mating with the block 231 prevent the locking differential 20 from unlocking once the cog 32 engages the second gear 36. The threads of the fastener 233 prevent the shaft 230 from sliding relative to the block 231. The threads of the fastener 233 mating with the shaft 230 prevent the locking differential 20 from locking once the cog 32 disengages the second gear 36. Other configurations are contemplated.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present locking differentials have been described in the context of particularly preferred embodiments, the skilled artisan will appreciate, in view of the present disclosure, that certain advantages, features and aspects of the assemblies may be realized in a variety of other applications, many of which have been noted above. Additionally, it is contemplated that various aspects and features of the invention described can be practiced separately, combined together, or substituted for one another, and that a variety of combination and sub combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A locking differential comprising:
   a housing;
   a planetary gear train at least partially disposed within the housing and including at least one gear;
   a cage having a first end and a second end, wherein the cage is configured to surround at least a portion of the planetary gear train;
   a cog fixedly coupled to the first end of the cage wherein engagement of the cog with the gear places the locking differential in a locked condition, and disengagement of the cog from the gear places the locking differential in an unlocked condition;
   a shaft coupled to the cage for manual actuation of the cage and the cog relative to the housing and the gear;
   wherein the locking differential has a first assembly configuration and a second assembly configuration, wherein in the first assembly configuration the locking differential is biased to the unlocked condition and must be manually actuated to be in the locked condition, and wherein in the second assembly configuration the locking differential is biased to the locked condition and must be manually actuated to be in the unlocked condition; and
   a first inlet and a second inlet, wherein the first inlet is configured to permit a flow of fluid to actuate the locking differential in the first assembly configuration and the second inlet is configured to permit the flow of fluid to actuate the locking differential in the second assembly configuration.

2. The locking differential of claim 1, further comprising an endplate, wherein the cog is configured to slide relative to the endplate.

3. The locking differential of claim 2, wherein the end plate is a unitary structure.

4. The locking differential of claim 2, wherein the endplate is configured to be load bearing when the locking differential is locked.

5. The locking differential of claim 2, wherein the endplate defines a recess, at least a portion of the cog being slidably received within the recess.

6. The locking differential of claim 1, further comprising a spring disposed between the housing and the cage when the locking differential is in the first assembly configuration.

7. The locking differential of claim 1, wherein in the first assembly configuration a bearing surface of the cog is biased away from a bearing surface of the gear in the planetary gear train.

8. The locking differential of claim 1, further comprising a spring disposed between the cog and an endplate when the locking differential is in the second assembly configuration.

9. The locking differential of claim 1, wherein in the second assembly configuration a bearing surface of the cog is biased toward a bearing surface of the gear in the planetary gear train.

10. The locking differential of claim 1, wherein the cog further comprises dogs configured to engage the gear of the planetary gear train.

11. The locking differential of claim 1, further comprising a screw configured to be rotated to translate the shaft.

12. A locking differential comprising:
a cage having a first end and a second end, wherein the cage is configured to surround at least a portion of a planetary gear train, the planetary gear train comprising a gear;
a cog fixedly coupled to the first end of the cage;
an endplate, wherein the cog is configured to slide relative to the endplate;
wherein the cog is configured to slide linearly to engage and disengage the gear and engagement of the cog with the gear places the locking differential in a locked condition and disengagement of the cog from the gear places the locking differential in an unlocked condition, wherein the locking differential has a first assembly configuration and a second assembly configuration, wherein in the first assembly configuration the cog is biased out of engagement with the gear and must be manually actuated to engage the gear, and wherein in the second assembly configuration the cog is biased into engagement with the gear and must be manually actuated to disengage the gear; and
a first inlet and a second inlet, wherein the first inlet and the second inlet are configured to permit a flow of fluid to slide the cog.

13. The locking differential of claim 12, further comprising at least one spring configured to bias the cog.

14. The locking differential of claim 13, wherein the at least one spring is manually repositionable by a user when converting the locking differential from the first assembly configuration to the second assembly configuration.

15. The locking differential of claim 12, wherein a source of fluid is configured to be repositionable by a user between the first inlet and the second inlet.

16. The locking differential of claim 12, further comprising a shaft configured to slide the cog.

17. The locking differential of claim 16, wherein the shaft is configured to be repositionable by a user to manually lock or unlock the locking differential.

18. The locking differential of claim 12, wherein the cog further comprises dogs configured to engage the gear.

* * * * *